United States Patent
Balakrishnan et al.

(10) Patent No.: US 12,238,752 B2
(45) Date of Patent: Feb. 25, 2025

(54) RELIABLE DEVICE-TO-DEVICE COMMUNICATION

(71) Applicant: Telefonaktiebolaget LM Ericsson (publ), Stockholm (SE)

(72) Inventors: Bipin Balakrishnan, Malmö (SE); Ashkan Kalantari, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 370 days.

(21) Appl. No.: 17/785,466

(22) PCT Filed: Dec. 16, 2019

(86) PCT No.: PCT/EP2019/085325
§ 371 (c)(1),
(2) Date: Jun. 15, 2022

(87) PCT Pub. No.: WO2021/121541
PCT Pub. Date: Jun. 24, 2021

(65) Prior Publication Data
US 2023/0008931 A1    Jan. 12, 2023

(51) Int. Cl.
*H04W 4/00* (2018.01)
*H04L 1/20* (2006.01)
(Continued)

(52) U.S. Cl.
CPC .......... *H04W 72/542* (2023.01); *H04L 1/203* (2013.01); *H04L 5/0055* (2013.01)

(58) Field of Classification Search
CPC . H04W 72/542; H04W 72/541; H04W 72/12; H04W 72/20; H04L 1/203; H04L 5/0055; H04L 5/0007
See application file for complete search history.

(56) References Cited

U.S. PATENT DOCUMENTS 9,794,129 B2    10/2017  Iovanna et al.
10,349,335 B2 *  7/2019  Thubert .............. H04W 56/001
(Continued)

FOREIGN PATENT DOCUMENTS

CN    108541039 A    9/2018
CN    104853365 B    1/2019
(Continued)

OTHER PUBLICATIONS

Author Unknown, "Technical Specification Group Services and System Aspects; Study on Communication for Automation in Vertical Domains (Release 16)," Technical Report 22.804, Version 16.2.0, Dec. 2018, 3GPP Organizational Partners 196 pages.
(Continued)

*Primary Examiner* — Abdelnabi O Musa
(74) *Attorney, Agent, or Firm* — Withrow & Terranova, PLLC

(57) ABSTRACT

Methods and apparatuses are disclosed herein for ascertaining reliability aspects for Device-to-Device (D2D) links prior to actual data transmission. In some embodiments, a method performed by a second Wireless Communication Device (WCD) comprises attempting to receive synthetic packet transmissions, each comprising R replicas of a respective synthetic packet, from a first WCD over a direct or indirect D2D link using a current resource allocation. The method further comprises determining that the D2D link violates a requirement based on results of the attempting to receive the synthetic packet transmissions and sending a violation notification to a Centralized Scheduler (CS). Corresponding embodiments of a second WCD are also disclosed. Embodiments of a method of operation of a first WCD and corresponding embodiments of the first WCD as well as embodiments of a method of operation of a CS and
(Continued)

corresponding embodiments of the CS are also described herein.

19 Claims, 18 Drawing Sheets

(51) Int. Cl.
    *H04L 5/00*     (2006.01)
    *H04W 72/542*     (2023.01)

(56) References Cited

U.S. PATENT DOCUMENTS

| | | | |
|---|---|---|---|
| 2006/0105764 | A1 | 5/2006 | Krishnaswamy et al. |
| 2015/0043385 | A1 | 2/2015 | Noh et al. |
| 2015/0126188 | A1* | 5/2015 | Lindoff ............... H04W 76/14 455/434 |
| 2016/0157043 | A1 | 6/2016 | Li et al. |
| 2016/0183219 | A1* | 6/2016 | Kim ................ H04W 52/38 370/329 |
| 2016/0295627 | A1* | 10/2016 | Karout ............... H04W 72/542 |
| 2017/0055270 | A1* | 2/2017 | Caretti ............... H04W 72/541 |
| 2017/0134935 | A1 | 5/2017 | Wei |
| 2017/0156078 | A1 | 8/2017 | Bienas et al. |
| 2017/0245166 | A1 | 8/2017 | Bienas et al. |
| 2019/0132784 | A1* | 5/2019 | Thubert ............. H04W 72/044 |
| 2019/0239112 | A1 | 8/2019 | Rao et al. |
| 2019/0289502 | A1* | 9/2019 | Abedini ............... H04W 8/22 |
| 2020/0177498 | A1 | 6/2020 | Thomas et al. |
| 2020/0288360 | A1 | 9/2020 | Zheng et al. |
| 2021/0007117 | A1* | 1/2021 | Park ................ H04B 7/0695 |
| 2021/0067281 | A1* | 3/2021 | Sarkis ................ H04L 1/1887 |
| 2022/0255689 | A1 | 8/2022 | Wen et al. |

FOREIGN PATENT DOCUMENTS

| | | |
|---|---|---|
| CN | 109561504 A | 4/2019 |
| EP | 3160202 A1 | 4/2017 |
| EP | 3220714 A1 | 9/2017 |
| EP | 3481106 A1 | 5/2019 |
| GB | 2574875 A | 12/2019 |
| WO | 2016099227 A1 | 6/2016 |
| WO | 2017143813 A1 | 8/2017 |
| WO | 2021254962 A1 | 12/2021 |
| WO | 2022156914 A1 | 7/2022 |

OTHER PUBLICATIONS

Author Unknown, "Technical Specification Group Services and System Aspects; Service requirements for cyber-physical control applications in vertical domains; Stage 1 (Release 16)," Technical Specification 22.104, Version 16.3.0, Sep. 2019, 3GPP Organizational Partners 54 pages.

Azari, et al., "Risk-Aware Resource Allocation for URLLC: Challenges and Strategies with Machine Learning," IEEE Communications Magazine, vol. 57, Issue 3, Dec. 2018, 7 pages.

Ben-Khalifa, et al., "Risk-Sensitive Reinforcement Learning for URLLC Traffic in Wireless Networks," Wireless Communications and Networking Conference, Nov. 2018, IEEE, 7 pages.

Li, Zheng, et al., "A Multi-Agent Deep Reinforcement Learning based Spectrum Allocation Framework for D2D Communications," IEEE Global Communications Conference, Dec. 2019, 6 pages.

Liang, et al., "Deep Learning based Wireless Resource Allocation with Application to Vehicular Networks," Proceedings of the IEEE, Jul. 2019, 13 pages.

Nokia, et al., "R1-133495: D2D Communication without network coverage," 3GPP TSG-RAN WG1 Meeting #74, Aug. 19-23, 2013, Barcelona, Spain, 6 pages.

Poirot, Valentin., "Energy Efficient Multi-Connectivity for Ultra-Dense Networks," Master's Thesis, Lulea University of Technology, 2017, 88 pages.

Poirot, et al., "Energy Efficient Multi-Connectivity Algorithms for Ultra-Dense 5G Networks," Wireless Networks, Jun. 22, 2019, Springer, 16 pages.

Prasad, et al., "Energy Efficient D2D Discovery for Proximity Services in 3GPP LTE-Advanced Networks: ProSe Discovery Mechanisms," IEEE Vehicular Technology Magazine, vol. 9, Issue 4, Dec. 2014, 9 pages.

Sahin, et al., "VRLS: A Unified Reinforcement Learning Scheduler for Vehicle-to-Vehicle Communications," 2nd Connected and Automated Vehicles Symposium, Jul. 2019, IEEE, 7 pages.

Wang, et al., "Reinforcement Learning with Perturbed Rewards," International Conference on Learning Representations, Oct. 2018, 24 pages.

International Search Report and Written Opinion for International Patent Application No. PCT/EP2019/085325, mailed Oct. 19, 2020, 17 pages.

CATT, "R2-2100227: RLF Indication and Local Rerouting," 3GPP TSG-RAN WG2 Meeting #113-e, Jan. 25-Feb. 5, 2021, Electronic Meeting, 3 pages.

International Search Report and Written Opinion for International Patent Application No. PCT/EP2022/072698, mailed Jun. 6, 2023, 25 pages.

Author Unknown, "Technical Specification Group Services and System Aspects; Service requirements for cyber-physical control applications in vertical domains; Stage 1 (Release 16)," Technical Specification 22.104, Version 16.2.0, Jun. 2019, 3GPP Organizational Partners 54 pages.

Raca, et al., "On Leveraging Machine and Deep Learning for Throughput Prediction in Cellular Networks; Design, Performance, and Challenges," IEEE Communications Magazine, Mar. 2020, pp. 11-17.

Invitation to Pay Additional Fees and Partial Search for International Patent Application No. PCT/EP2021/051634, mailed Oct. 22, 2021, 16 pages.

International Search Report and Written Opinion for International Patent Application No. PCT/EP2021/051634, mailed Dec. 9, 2021, 24 pages.

* cited by examiner

Note: Timers and TX scheduler can be (is) shared with (from) other logic in UE

RELIABLE DEVICE-TO-DEVICE COMMUNICATION

This application is a 35 U.S.C. § 371 national phase filing of International Application No. PCT/EP2019/085325, filed Dec. 16, 2019, the disclosure of which is incorporated herein by reference in its entirety.

TECHNICAL FIELD

The present disclosure relates to network-assisted Device-to-Device (D2D) communication.

BACKGROUND

Device-to-Device (D2D) was developed for direct communication between User Equipments (UEs) or as a relay to enhance coverage of a cellular communications network. The initial standardization of D2D in the context of cellular communication was done in Third Generation Partnership Project (3GPP) Long Term Evolution (LTE) Release 12 and also covers model and model resource allocations. However, there is a need resource allocation schemes that enhance the reliability of D2D communication, e.g., for Ultra Reliable Low Latency Communication (URLLC).

In [2], the authors propose a risk-sensitive Reinforcement Learning (RL) framework to model and solve the frequency slot allocation and the package success delivery rate to enhance the reliability of wireless communication. In [2], the frequency slot allocation and the package success delivery rate are modeled into an RL framework. Based on the history of the allocated frequency slots, action, and the package error rate, new frequency slots are allocated to wireless communication links. The RL framework in [2] considers a perfect feedback channel for Hybrid Automatic Repeat Request (HARQ) Acknowledgements (ACKs)/Negative Acknowledgments (NACKs) and works on the actual data to be transmitted. The RL framework in [2] considers the average of the successfully transmitted packets as the reward metric.

U.S. Patent Application Publication No. 2017/0245166 A1 describes a resource controller that allocates resources between D2D and cellular traffic without considering any reliability with bounded latency aspects.

U.S. Patent Application Publication No. 2017/0134935 A1 describes a system in which a data transmission and its re-transmissions are based on available resource pools and also error rates. However, the disclosed system does not include latency in either data transfer or resource allocation. Also, it seems to prioritize re-transmissions based on available amount of resources rather than based on whether guaranteed service can be enabled. Further, the disclosed system operates on the actual data only and does not mention when the error statistics are collected to adjust the resource allocation.

Existing solutions for resource allocation, particularly for D2D communication, suffer from many issues that make them unsuitable for URLLC. Thus, there is a need for new resource allocation schemes for D2D communication in a wireless network and, in particular, resource allocation schemes for D2D communication in a wireless network that is suitable for critical low latency traffic such as, e.g., URLLC traffic. There is also a need for addressing when an application with URLLC requirements fails in a system.

SUMMARY

Methods and apparatuses are disclosed herein for ascertaining reliability (e.g., robust data transfer with bounded latency) aspects for multiple Device-to-Device (D2D) links in parallel without actual time-critical application data transmission. In some embodiments, a method performed by a second Wireless Communication Device (WCD) to ascertain whether a D2D link between a first WCD and the second WCD in a cellular communications system is able to satisfy a requirement comprises attempting to receive a plurality of synthetic packet transmissions from the first WCD over a D2D link using a current resource allocation. Each synthetic packet transmission of the plurality of synthetic packet transmissions comprises R replicas of a respective synthetic packet, wherein R is a natural number that is greater than or equal to 1. The method further comprises determining that the D2D link violates the requirement based on results of the attempting to receive the plurality of synthetic packet transmissions. The method further comprises, upon determining that the D2D link violates the requirement, sending, to a Centralized Scheduler (CS) in the cellular communications system, a violation notification that notifies the CS that the D2D link violates the requirement when using the current resource allocation. In this manner, the reliability of the D2D link can be determined using synthetic packet transmissions (i.e., prior to transmission of any real data).

In some embodiments, the requirement is a reliability requirement. In some embodiments, the reliability requirement comprises a required packet success rate, where a packet success comprises receiving a packet within a required latency bound. In some other embodiments, the requirement comprises a required latency bound.

In some embodiments, sending the violation notification comprises sending an indirect Negative Acknowledgement (NACK) to the CS. In some embodiments, the method further comprises sending, to the CS, a statistics report comprising a packet success rate for the D2D link using the current resource allocation.

In some embodiments, the resource allocation comprises a number of time-frequency resources.

In some embodiments, the method further comprises receiving a new resource allocation and attempting to receive a plurality of synthetic packet transmissions from the first WCD over the D2D link using the new resource allocation, where, each synthetic packet transmission of the plurality of synthetic packet transmissions comprises R' replicas of a respective synthetic packet and R' is a natural number that is greater than or equal to 1 and may or may not equal R. The method further comprises determining whether the D2D link violates the requirement based on results of the attempting to receive the plurality of synthetic packet transmissions over the D2D link using the new resource allocation.

In some embodiments, the method further comprises receiving either a new resource allocation or a notification that the requirement cannot be met using the D2D link.

In some embodiments, attempting to receive the plurality of synthetic packet transmissions from the first WCD over the D2D link using the current resource allocation, determining that the D2D link violates the requirement, and sending the violation notification are performed during a set up phase. In some embodiments, if the D2D link is able to meet the requirement at an end of the set up phase, a resource allocation used for the D2D link during the set up phase is used as an initial resource allocation for the D2D link during a running phase.

In some embodiments, for each synthetic packet transmission of the plurality of synthetic packet transmissions, the R replicas of the synthetic packet are transmitted on different time resources. In some other embodiments, for each synthetic packet transmission of the plurality of synthetic packet transmissions, the R replicas of the synthetic packet are transmitted on different frequency resources but at least partially overlap in time.

In some embodiments, the D2D link is a direct D2D link between the first WCD and the second WCD. In some other embodiments, the D2D link is an indirect D2D link between the first WCD and the second WCD. In some other embodiments, the D2D link is one hop of a multi-hop D2D link.

In some embodiments, the CS is implemented in a base station in the cellular communications system or in a network node associated with the base station in the cellular communications system. In some other embodiments, the CS is implemented in either the first WCD or the second WCD.

In some embodiments, a second WCD for ascertaining whether a D2D link between a first WCD and the second WCD in a cellular communications system is able to satisfy reliability requirement is adapted to attempt to receive a plurality of synthetic packet transmissions from the first WCD over a D2D link using a current resource allocation, where each synthetic packet transmission of the plurality of synthetic packet transmissions comprises R replicas of a respective synthetic packet and R is a natural number that is greater than or equal to 1. The second WCD is further adapted to determine that the D2D link violates the requirement based on results of the attempting to receive the plurality of synthetic packet transmissions. The second WCD is further adapted to, upon determining that the D2D link violates the requirement, send, to a CS in the cellular communications system, a violation notification that notifies the CS that the D2D link violates the requirement when using the current resource allocation.

In some embodiments, the second WCD comprises one or more transmitters, one or more receivers, and processing circuitry associated with the one or more transmitters and the one or more receivers. The processing circuitry is configured to cause the second WCD to attempt to receive the plurality of synthetic packet transmissions from the first WCD over the D2D link using the current resource allocation, determine that the D2D link violates the requirement, and send the violation notification upon determining that the D2D link violates the requirement.

In some embodiments, a method performed by a CS comprises determining, prior to transmission of actual data over a plurality of D2D links between respective pairs of WCDs, whether the plurality of D2D links are able to satisfy respective requirements. The method further comprises notifying at least one WCD in each of the pairs of WCDs of whether a respective D2D link, from among the plurality of D2D links, is able to satisfy the respective requirement.

In some embodiments, the respective requirements comprise respective reliability requirements. In some embodiments, the respective reliability requirements comprise respective required packet success rates, where a packet success comprises receiving a packet within a required latency bound. In some other embodiments, the respective requirements comprise respective latency bounds.

In some embodiments, at least two of the plurality of D2D links have different respective reliability requirements.

In some embodiments, determining, prior to transmission of actual data over the plurality of D2D links between the respective pairs of WCDs, whether the plurality of D2D links are able to satisfy the respective requirements comprises determining whether the plurality of D2D links are able to satisfy the respective requirements using a risk-sensitive Reinforcement Learning (RL) procedure. In some embodiments, the risk-sensitive RL procedure takes into account different requirements for different D2D links. In some embodiments, the risk-sensitive RL procedure uses Q-learning. In some embodiments, the risk-sensitive RL procedure uses an $\epsilon$-greedy approach in Q-learning. In some embodiments, Q-values are initialized based on Q-values previously determined for another environment. In some embodiments, a reward utilized by the risk-sensitive RL procedure is a statistical average of weighted packet success rates. In some embodiments, a reward utilized by the risk-sensitive RL procedure is a statistical average of worst-case packet success rate.

In some embodiments, determining whether the plurality of D2D links are able to satisfy respective requirements using the risk-sensitive RL procedure comprises entering a risk state based on a notification or determination that at least one of the plurality of D2D links has failed the respective requirement for the at least one of the plurality of D2D links and applying a negative reward for a respective state/action. In some embodiments, entering the risk state comprises entering the risk state upon receiving a violation notification for one of the plurality of D2D links from a WCD associated with the one of the plurality of D2D links. In some embodiments, the violation notification is received via an indirect NACK mechanism.

In some embodiments, determining whether the plurality of D2D links are able to satisfy respective requirements comprises determining whether the plurality of D2D links are able to satisfy the respective requirements using a RL procedure that applies a noisy feedback mechanism. In some embodiments, determining whether the plurality of D2D links are able to satisfy the respective requirements using a RL procedure that applies a noisy feedback mechanism comprises adapting a reward used by the RL procedure based on a confusion matrix.

In some embodiments, a network node that implements a CS is adapted to determine, prior to transmission of actual data over a plurality of D2D links between respective pairs of WCDs, whether the plurality of D2D links are able to satisfy respective requirements. The network node is further adapted to notify at least one WCD in each of the pairs of WCDs of whether a respective D2D link, from among the plurality of D2D links, is able to satisfy the respective requirement.

In some embodiments, the network node comprises processing circuitry configured to cause the network node to determine, prior to transmission of actual data over a plurality of D2D links between respective pairs of WCDs, whether the plurality of D2D links are able to satisfy respective requirements, and notify at least one WCD in each of the pairs of WCDs of whether a respective D2D link, from among the plurality of D2D links, is able to satisfy the respective requirement.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
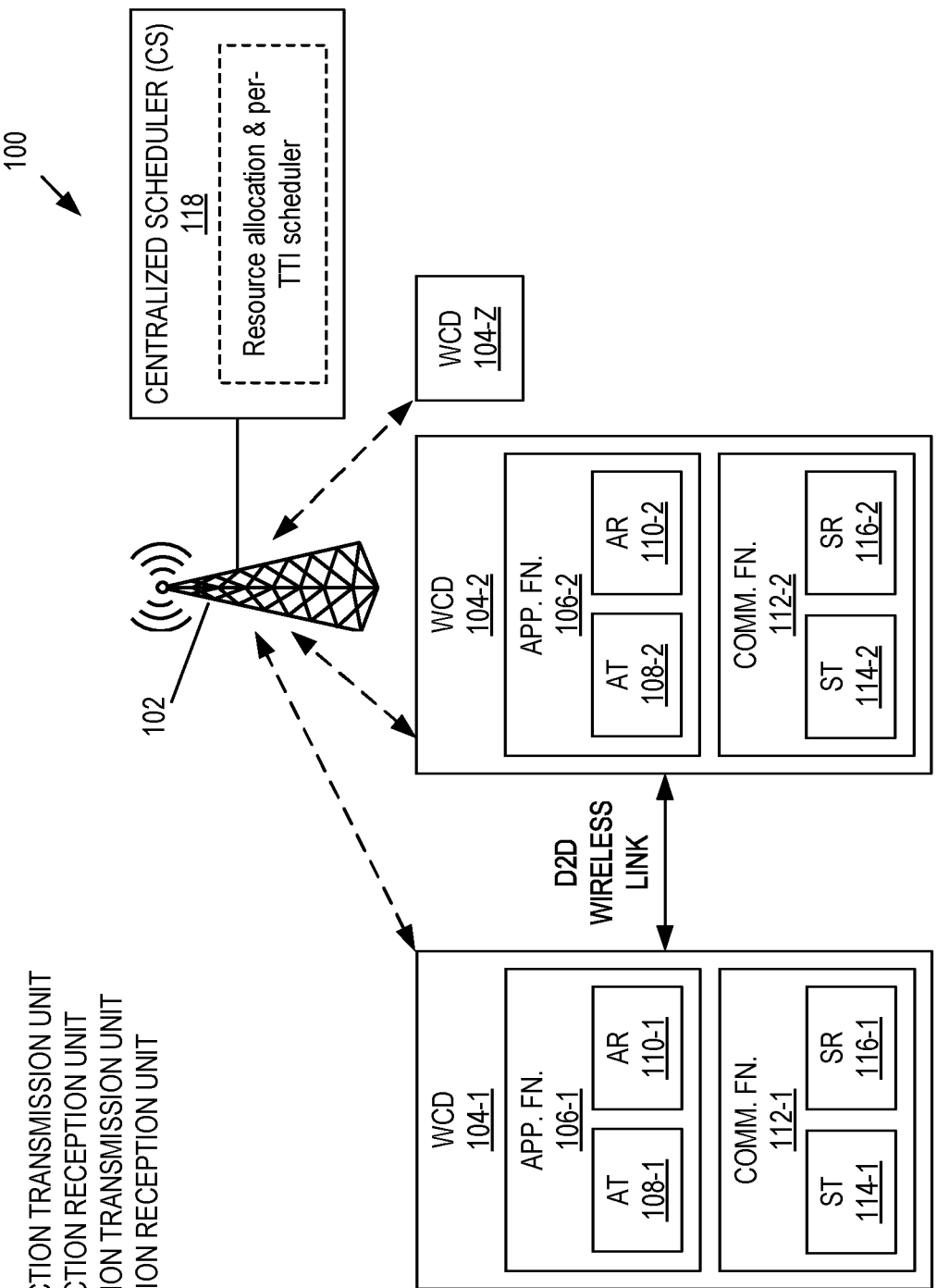
FIG. 1 illustrates one example of a system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Existing solutions offer Quality of Service (QoS)/reliability policies based on either theoretical evaluations or actual application data transfer. Understanding the reliability before system usage for many upcoming wireless application scenarios such as (industrial) automation over wireless networks is important since the failures can lead into significant economic costs and/or safety issues. Such problems might be difficult to be inferred from simulations or theoretical approaches due to limited operating environment knowledge.

Existing solutions for resource allocation, particularly for Device-to-Device (D2D) communication, suffer from many issues that make them unsuitable for Ultra Reliable Low Latency Communication (URLLC). For instance, in [2], the reward metric is the average of successfully transmitted packets. This reward metric does not take into account latency, which is critical for URLLC. Also, [2] considers a perfect feedback channel for Hybrid Automatic Repeat Request (HARQ) Acknowledgement (ACK)/Negative Acknowledgement (NACK), which may not be the case for all scenarios. Further, existing solutions either base their resource allocations obtained from transmission of real data or simulations, neither of which give a true indication of reliability of a link before system usage. This is unacceptable for many upcoming wireless application scenarios (e.g., automation, such as industrial automation, over wireless networks) since failures can lead to significant economic loss and/or safety issues. Such problems can be difficult to infer from simulations or theoretical approaches due to limited operating environment knowledge.

As used herein, "ultra reliability" is defined as robust data transfer within a latency bound (e.g., 99.9999% of the packets are transmitted correctly within 1 millisecond (ms)). In other words, if a correct packet is delivered late, it is considered as a failure (i.e., a violation of the reliability requirement).

Existing solutions allocate resources for D2D communication without considering the latency bounds of any new D2D link(s) and that of existing D2D links. Further, existing solutions that do Reinforcement Learning (RL) based resource allocation do not consider an imperfect (e.g., error prone) feedback channel to collect the packet delivery success. Further, existing solutions such as [2] consider the average of the successfully transmitted packets as the reward metric and do not focus on satisfying the minimum required condition for all the links.

Thus, there is a need for new resource allocation schemes for D2D communication in a wireless network and, in particular, resource allocation schemes for D2D communication in a wireless network that is suitable for critical low latency traffic such as, e.g., URLLC traffic.

Systems and methods are disclosed herein for ascertaining whether D2D communication can be used to provide reliable data transfer (e.g., robust data transfer with bounded latency). In some embodiments, the systems and methods include aspects that enable scaling to more devices that benefit from D2D communications without compromising the QoS guarantees for existing devices.

Methods and apparatuses are disclosed herein for ascertaining reliability (e.g., robust data transfer with bounded latency) aspects for multiple D2D links in parallel without actual time-critical application data transmission. In some embodiments, a risk-sensitive RL based resource allocation procedure is provided that is based on weighted rewards per link, where this risk-sensitive RL based resource allocation procedure works even with imperfect feedback channels, which is referred to as RL with corrupted reward channel, perturbed rewards, or noisy rewards.

Embodiments of a procedure and related components (e.g., variable-size packet generator with time-stamping and analyzer) that are implemented in devices for D2D data transmission along with the capability to collect and report statistics for the D2D links (e.g., packet error rate, number of transmitted packets, and allocated frequency slots to a central resource scheduler) are disclosed. In some embodiments, a Centralized Scheduler (CS) uses the reported statistics for the D2D links and application knowledge for dynamic update of time, frequency, and/or spatial resource allocations to meet a required reliability constraint for each D2D link. Instead of packet re-transmissions, embodiments disclosed herein send a synthetic packet (not real data) a fixed number of times (i.e., send R replicas of a packet), thereby ensuring bounded latency and utilizing the resource allocation that would nevertheless be allocated for re-transmissions. Thus, this scheme allows verification of an actual scenario in a real environment via a virtual run of that specific scenario. This also enables the system to enable transmission of real data of D2D link(s) with confidence, e.g. even in new use cases in which a wireless infrastructure is used in a scenario that has traditionally been served via a wired infrastructure.

As the system scales up in terms of number of devices and the available amount and types of resources, the problem gets more complicated. One of the challenges is acquiring Channel State Information (CSI) in a low latency setting. On the other hand, unavailability of CSI is a barrier toward analytical optimal resource allocation. As a solution to perform optimal resource allocation without CSI, in some embodiments, a model-free control algorithm, such as Q-learning, can be used for initial statistics collection as well as the dynamic update of the resource allocation during the actual D2D communications. Since it is important to satisfy the minimum required condition for all D2D links, in some embodiments, the minimum packet error rate is utilized as the reward measurement per D2D link for the model-free control algorithm. In addition, different D2D links with different requirements may be operating at the same time, e.g. different reliability and latency requirements. Therefore, in some embodiments, weighting the reward of these D2D links is utilized to define a reward measurement that best describes the importance of each D2D link. Furthermore, resource allocations satisfying the reliability requirements of all current and newly added D2D links are guaranteed. Note that, in some cases, there may not be sufficient resources to guarantee the URLLC condition for newly added links, i.e., demand may be more than the available resources. In some embodiments, only the resource allocations of failing D2D links are updated to speed up arriving at a new resource allocation state that satisfies the reliability requirements of all D2D links.

In some embodiments, the model-free control algorithm is a Q-learning algorithm that requires initialization of its related Q-values when it starts learning in a specific environment. In some embodiments, in case the current environment is similar to a prior environment in which the Q-learning algorithm was performed, the statistics and/or Q-values gathered from the prior environment could be used for initialization in the current environment (e.g., if the structure of a modular factory is partly changed or used in another factory with the same configuration).

In the embodiments described herein, it is assumed that all devices in the system have a shared notion of time, e.g., from Time Sensitive Networking (TSN) deployment in a 5G system. Though the focus herein is on D2D transmissions, the scheme would also work for multi-hop communications with minor adaptations. Note that, as used herein, a "D2D link" may be either a "direct D2D link" or an "indirect D2D link." As used herein, a "direct D2D link" is a D2D link directly between two wireless communication devices, whereas an "indirect D2D link" is a D2D link that between two wireless communication devices that passes through one or more intermediary nodes (e.g., one or more other wireless devices and/or one or more base stations). Also note that while much of the description provided herein focuses on a direct D2D link, the embodiments described herein can be extended to an indirect D2D link. Further, in the case of an indirect D2D link, embodiments described herein can be used for each hop or sub-link within the indirect D2D link. The solution should work or is easily adaptable for applications that need just bounded latency only (e.g., use cases that lie between URLLC and enhanced Mobile Broadband (eMBB)) and not stringent reliability requirements.

Solutions described herein provide embodiments of a method and apparatus to ensure reliable (robustness with bounded latency) data transfer. First, the solution utilizes synthetic packet transmission prior to the run time transmission to ascertain the reliability guarantees, thereby ensuring that actual data transmission starts with required and timely resource allocation in the exact operating environment. Secondly, in some embodiments, the solution provides a risk-sensitive RL framework that considers an imperfect feedback channel to do the resource allocation of the new D2D links while also providing continuing guarantees on existing D2D links. In some embodiments, this RL framework considers weighting the reward of each D2D link to define a reward measurement which best describes the importance of each D2D link.

FIG. 1 illustrates one example of a system 100 in which embodiments of the present disclosure may be implemented. The system 100 includes a base station 102 in a RAN of a cellular communications system (e.g., a 3GPP cellular communications system). For example, the base station 102 may be a gNB in a 5G NR RAN; however, the base station 102 is not limited thereto. The system 100 also includes a number of Wireless Communication Devices (WCDs) 104-1 through 104-Z, which are generally referred to herein as WCDs 104. The WCDs 104 may be, for example, UEs. At least some of the WCDs 104 are capable of D2D communication. For instance, in the illustrated example, there is a D2D link between WCD 104-1 and WCD 104-2. Note, however, that there may be additional D2D links between other WCDs 104, as will be appreciated by one of skill in the art.

Using the WCD 104-1 as an example, the WCD 104-1 includes an application function 106-1 that includes an Application Function Transmission Unit (AT) 108-1 and an Application Function Reception Unit (AR) 110-1. The WCD 104-1 also includes a communication function 112-1 that includes a Synthetic Function Transmission Unit (ST) 114-1 and a Synthetic Function Reception Unit (SR) 116-1. Likewise, the WCD 104-2 includes an application function 106-2 that includes an AT 108-2 and an AR 110-2 and a communication function 112-2 that includes an ST 114-2 and an SR 116-2. In the same manner, other WCDs 104 may also include application functions 106 and communication functions 112. In some embodiments, the application functions 106, including the ATs 108 and the ARs 110, are implemented in software (e.g., software that is executed by processing circuitry of the WCDs 104 to cause the WCDs 104 to perform the functions of the communication functions 112 described herein); however, the application functions 106 are not limited thereto. In some embodiments, the communication functions 112, including the STs 114 and the SRs 116, are implemented in software or a combination of hardware and software (e.g., software executed by processing circuitry of the WCDs 104 to cause the WCDs 104 to perform the functions of the communication functions 112 described herein); however, the communication functions 112 are not limited thereto.

A CS 118 is either implemented at the base station 102 or at another node (e.g., another node in the RAN or another node in the cellular communications system). Alternatively, the CS 118 is implemented at a WCD 104 such as, e.g., either the WCD 104-1 or the WCD 104-2. In some embodiments, the CS 118 is implemented in software that is executed by processing circuitry of the node to cause the node to perform the functions of the CS 118 described herein.

Figure 3:
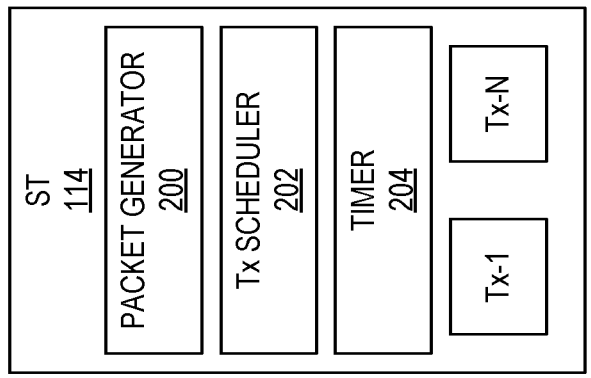
FIG. 3 illustrates an Synthetic Function Reception Unit (SR) of FIG. 1 in more detail, in accordance with one example embodiment of the present disclosure.
Figure 2:
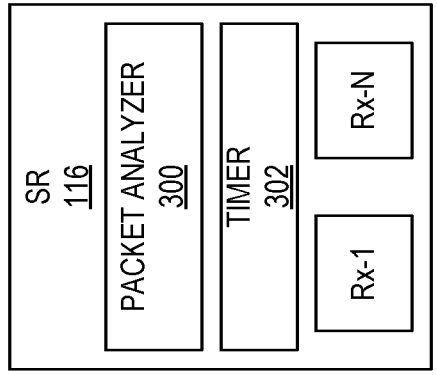
FIG. 2 illustrates an Synthetic Function Transmission Unit (ST) of FIG. 1 in more detail, in accordance with one example embodiment of the present disclosure.

FIG. 2 illustrates an ST 114 in more detail, in accordance with one example embodiment of the present disclosure. As illustrated, the ST 114 includes a packet generator 200, a transmit (Tx) scheduler 202, and a timer 204. FIG. 3 illustrates an SR 116 in more detail, in accordance with one example embodiment of the present disclosure. As illustrated, the SR 116 includes a packet analyzer 300 and a timer 302.

Figure 4:
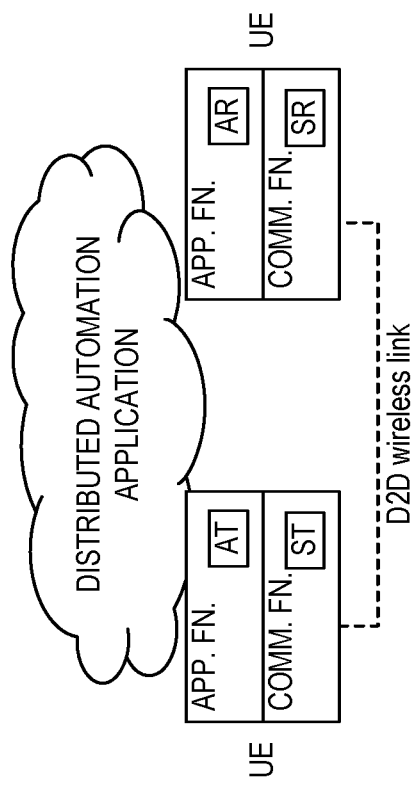
FIG. 4 illustrates one example implementation of the system of FIG. 1 in which the Device to Device (D2D) links are used for communication of critical traffic (e.g., Ultra-Reliable Low-Latency Communication (URLLC)) traffic in a distributed automation system.

While the operation of the application functions 106, the communication functions 112, and the CS 118 are described below in detail, in general, they operate together to determine whether guaranteed service can be enabled via D2D link(s) (i.e., whether particular requirements such as, e.g., reliability requirements can be met via D2D link(s)) between WCDs 104 in a manner that is particularly well-suited for critical traffic having a latency requirement such as, for example, URLLC traffic. Note that some D2D system components (e.g., for authentication, device pairing, etc.) may be located in a core network of the cellular communications system and are not shown for sake of simplicity. For example, FIG. 4 illustrates one example implementation of the system 100 in which the D2D links are used for communication of critical traffic (e.g., URLLC) traffic in a distributed automation system.

Using the example of FIG. 1, the WCDs 104-1 and 104-2 are paired for ascertaining whether reliable D2D communication between the WCDs 104-1 and 104-2 is possible. Considering a data transmission from WCD 104-1 to WCD 104-2, at the transmit end of the D2D link, WCD 104-1 includes the ST 114-1, which includes the packet generator 200, the Tx scheduler 202, and the timer 204. The packet generator 200 performs header and variable payload generation and time stamping (e.g., 32 bit time stamping with indication for wrap-around). The packet generator 200 also maintains a statistic of the number of transmitted packets and a respective replication factor. As used herein, "replication" is when the same packet is sent R times, where R is the replication factor. In other words, the replication factor R indicates how many times the same packet is to be transmitted. The Tx scheduler 202 works in accordance with a resource allocation and Transmission Time Interval (TTI) schedule provided by the CS 118.

On the receive end, at the WCD 104-2, the SR 116-2 includes the packet analyzer 300 and the timer 302. The timer 302 has a shared notion of time with the timer 204 at the transmit end and the rest of the system 100. The packet analyzer 300 is configured with the same replication factor as its counterpart packet generator 200 at the transmit end.

The packet analyzer 300 checks packet transmissions received over the D2D link for data integrity, extracts the time stamp information, and determines the packet transmission latency. The packet analyzer 300 checks whether a packet is received correctly and within a predefined or preconfigured latency bound (e.g., as required by the application). When the latency bound is not met, it is considered as a violation and captured as a statistic. Furthermore, the packet analyzer 300 can also maintain a statistic of packets (or replicas) received in error, total packets received, and/or latency variations/jitter of all received packets/replicas.

The configuration setup (e.g., replication factor, periodic/aperiodic transmission, etc.) is done by the CS 118. The statistics collected by the packet analyzer 300 can be pushed by the WCDs 104 on a programmed periodicity or pulled by the CS 118 on a need basis. Also, on a critical error (e.g., latency requirement is not met or cumulative packet error beyond a required threshold), the respective WCD 104 (e.g., the SR 116 of the respective WCD 104) sends a violation notification to the CS 118, e.g. via normal reliable data transfer. This violation notification can be via NACK in an indirect HARQ mechanism, and then details of the statistics can be reported to the CS 118 with statistic report message. Note that, as used herein, an indirect HARQ mechanism is a HARQ mechanism in which the receiving device first sends the ACK/NACK to a node (other than the transmitting device), where this node may then send the ACK/NACK to the transmitting device. In some embodiments, the indirect NACK is delayed such that it is only transmitted when the critical error condition is hit because HARQ re-transmissions are not used. An alternative approach would be to add a flag that indicates the violation of reliability requested in the statistic report message instead of sending a NACK. Either of these two approaches can be used to signal a violation.

Now, a more detailed description of the operation of the system 100 to perform resource allocation for D2D link(s) will be provided. In general, the procedure consists of two phases, namely, an initial set up phase and a subsequent running phase.

Set Up Phase

Figure 5:
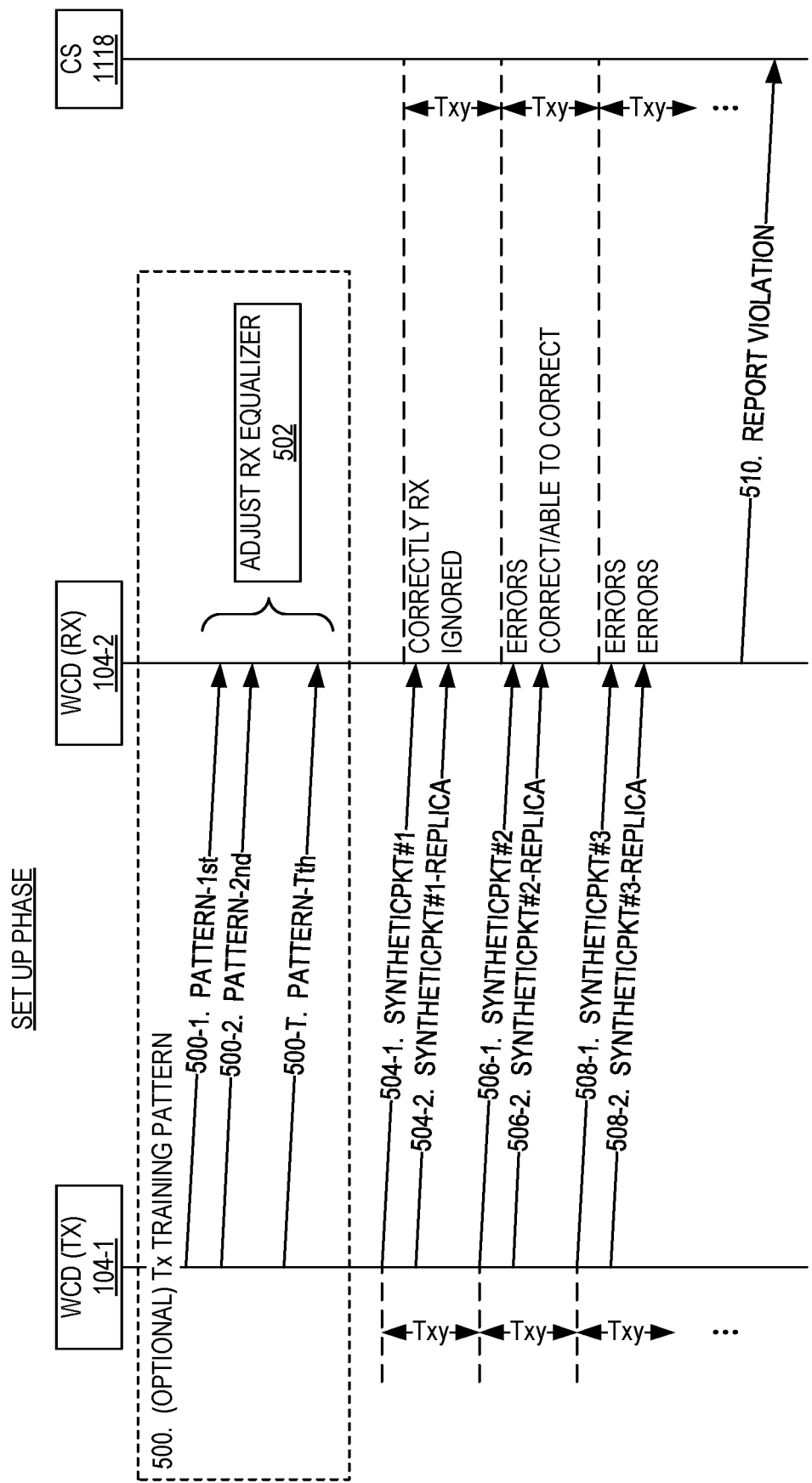
FIG. 5 illustrates the operation of two of the Wireless Communication Devices (WCDs) and the Central Scheduler (CS) of FIG. 1 to perform an initial set up phase for resource allocation for a D2D link between the WCDs, in accordance with some embodiments of the present disclosure.

FIG. 5 illustrates the operation of the WCD 104-1, the WCD 104-2, and the CS 118 to perform an initial set up phase for resource allocation for a D2D link between the WCD 104-1 and the WCD 104-2, in accordance with some embodiments of the present disclosure. Optionally, the WCD 104-1, and more specifically, the ST 114-1 of the WCD 104-1, transmits T replicas of a training pattern (step 500). Specifically, the ST 114-1 of the WCD 104-1 transmits a first replica (i.e., an initial instance) of the training pattern (step 500-1), transmits a second replica of the training pattern (500-2), . . . , and transmits the T-th replica of the training pattern (500-T). At the receiver side, the WCD 104-2 adjusts a receive (Rx) equalizer of the WCD 104-2 based on the T replicas of the training pattern, as will be appreciated by one of skill in the art (step 502). Note that this optional training step can be run before actual transmission, e.g. when a new factory configuration is being set up.

During the set up phase, synthetic packets (i.e., packets that are not actual data transmissions) are generated by the ST 114-1 of the WCD 104-1 and each transmitted R times, where again R is the replication factor. For instance, in the particular example of FIG. 5, R=2 such that the synthetic packets are each transmitted twice. More specifically, in this example, the ST 114-1 of the WCD 104-1 transmits a first replica of a first synthetic packet (step 504-1) and transmits a second replica of the first synthetic packet (step 504-2). Note that the replicas such as those transmitted in steps 504-1 and 504-2 may be transmitted sequentially (i.e., using different time resources) or may be transmitted such that they fully or partially overlap in time (e.g., are transmitted simultaneously) using different frequency resources (e.g., using different frequency bands). After an amount of time Txy after transmission of the first replica of the first synthetic packet, the ST 114-1 of the WCD 104-1 transmits a first replica of a second synthetic packet (step 506-1) and transmits a second replica of the second synthetic packet (step 506-2). After an amount of time Txy after transmission of the first replica of the second synthetic packet, the ST 114-1 of the WCD 104-1 transmits a first replica of a third synthetic packet (step 508-1) and transmits a second replica of the third synthetic packet (step 508-2). The process continues in this manner until some stopping criterion is reached (e.g., a configured number of synthetic packets have been transmitted). Note that, in this embodiment, the synthetic packets are transmitted with a periodicity of Txy. Further, in some variations of this embodiment, the replicas are transmitted with a constant duration of time between replicas. However, other transmission schemes can be used. For example, there may be variations in the amount of time between replicas and/or variations in the amount of time between the transmission of the first replica of one synthetic packet and the transmission of the first replica of the next synthetic packet.

At the receiver side, in this example, the SR 116-2 of the WCD 104-2 correctly receives the first replica of the first synthetic packet in step 504-1. As such, the SR 116-2 of the WCD 104-2 may ignore the second replica of the first synthetic packet. However, the SR 116-2 of the WCD 104-2 receives the first replica of the second synthetic packet in error in step 506-1, but receives the second replica of the second synthetic packet partially correct. As such, the SR 116-2 of the WCD 104-2 may buffer the first replica of the second synthetic packet and use it to correct the second replica of the second synthetic packet. In this example, the SR 116-2 of the WCD 104-2 receives both the first replica of the third synthetic packet in step 508-1 and the second replica of the third synthetic packet in step 508-2 in error. This leads to an error condition and, as such, the SR 116-2 at the WCD 104-2 triggers and sends a violation notification to the CS 118 (step 510).

Once a violation notification is received, the CS 118 reassigns the resource allocation for the D2D link until the "risk state", i.e. the packet error rate of at least one of the D2D links goes below a predefined threshold, is removed. For example, as discussed below, the CS 118 may perform the resource allocation using an $\epsilon$-greedy approach in Q-learning.

Thus, the set up phase can be used to ascertain whether the D2D link can satisfy application requirements without running the real application either with other traffic in the background or standalone. The statistics collected from the initial setup phase can be used for initialization of an RL algorithm, which can be used to address the resource allocation challenge when scaling up with more WCDs 104.

Figure 6:
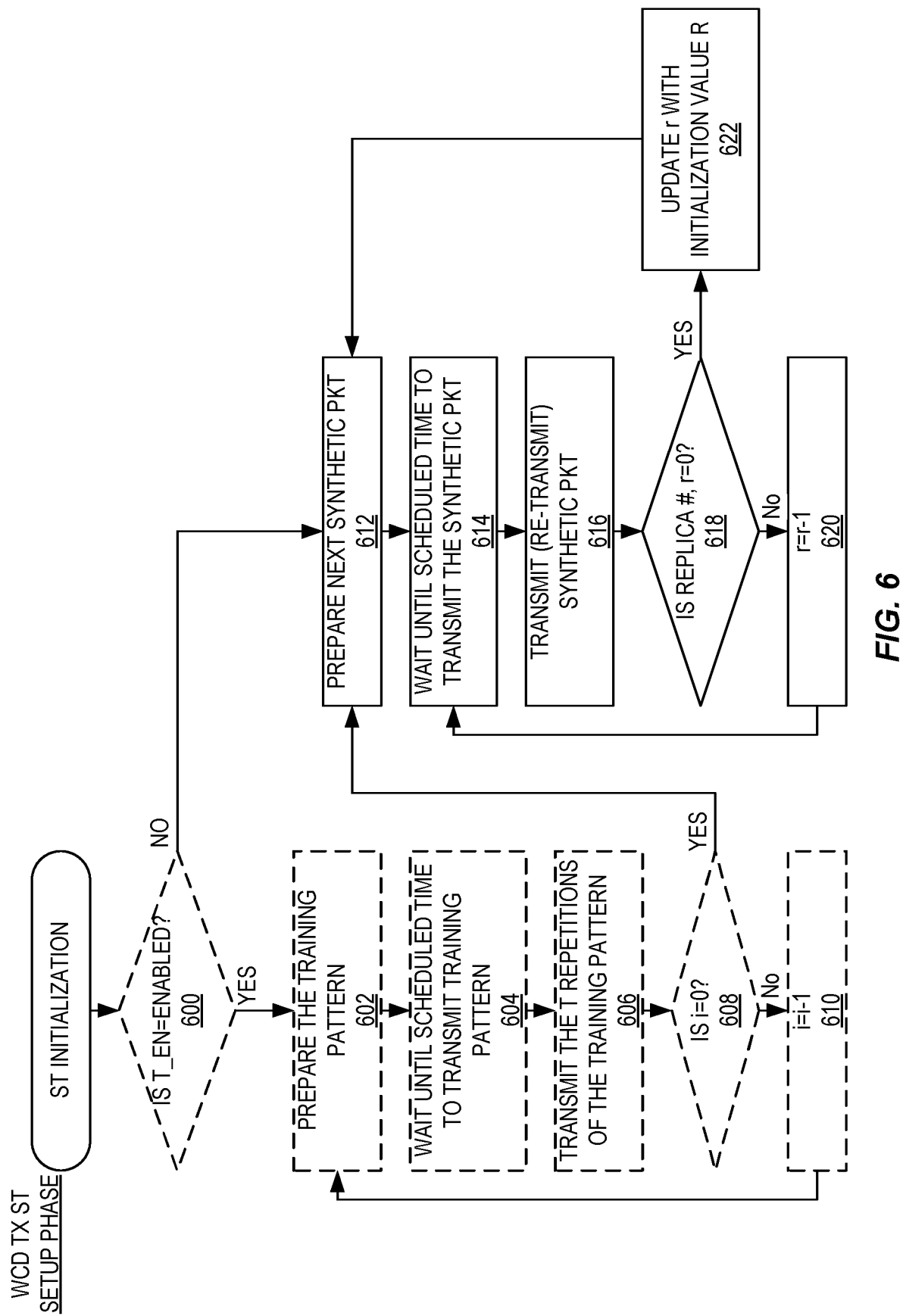
FIG. 6 illustrates the operation of the transmitting WCD during the set up phase in accordance with one example embodiment of the present disclosure.
Figure 7:
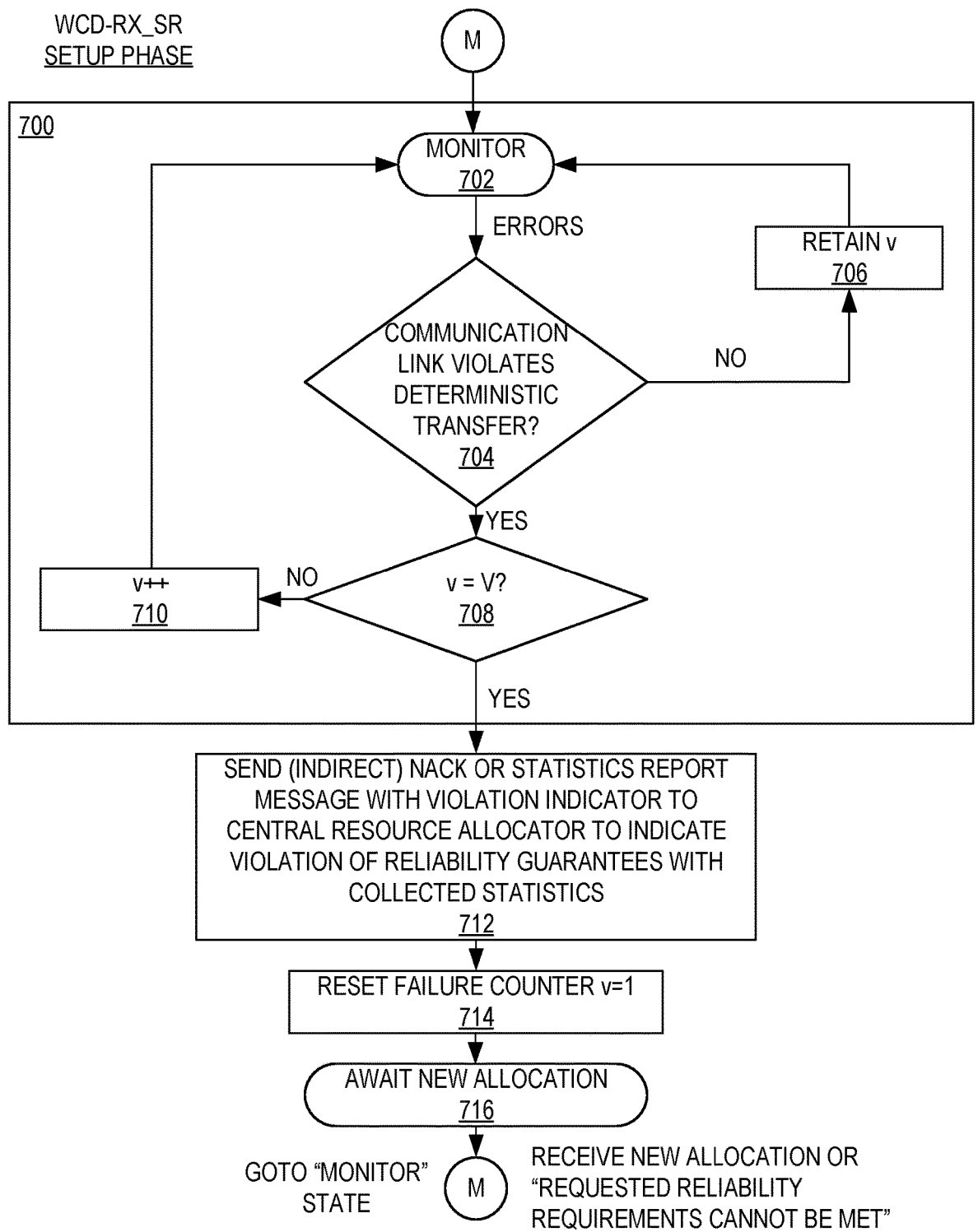
FIG. 7 illustrates the operation of the receiving WCD during the set up phase in accordance with one example embodiment of the present disclosure.
Figure 8:
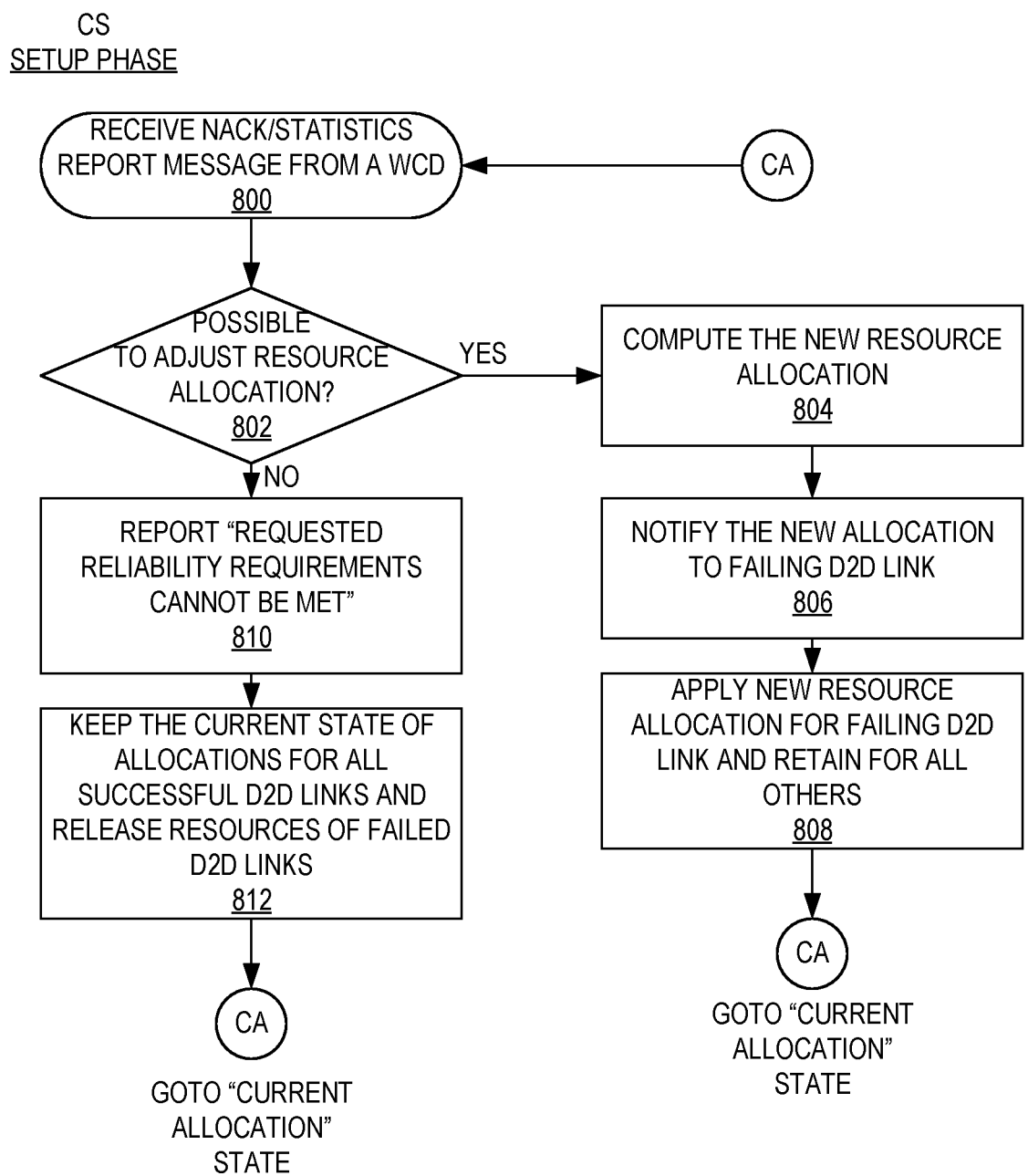
FIG. 8 illustrates the operation of the CS during the set up phase in accordance with one example embodiment of the present disclosure.

FIGS. 6 through 8 are flow charts that illustrate the operation of the Tx WCD (i.e., WCD 104-1 in the example above), the Rx WCD (i.e., the WCD 104-2 in the example above), and the CS 118 during the set up phase, in accordance with one example embodiment of the present disclosure. In particular, FIG. 6 illustrates the operation of the Tx WCD during the set up phase in accordance with one example embodiment of the present disclosure. Continuing the example from above, the Tx WCD is, in this example, the WCD 104-1. Optional steps are represented by dashed lines/boxes. As illustrated, in embodiments in which the WCD 104-1 may transmit the training sequence, the ST 114-1 at the WCD 104-1 determines whether training is enabled (step 600). Training may be enabled locally at the WCD 104-1 (e.g., via a configuration or setting).

If training is enabled, the ST 114-1 at the WCD 104-1 prepares or generates the training sequence or pattern (step 602) and waits until a scheduled time to transmit the training pattern (step 604). The scheduled time is preferably scheduled by the CS 118. At that time, the ST 114-1 transmits (or initiates transmission of) the T replicas of the training pattern, as described above. More specifically, a counter i for the number of transmitted replicas is initialized to the desired number of replicas T. The ST 114-1 transmits (or initiates transmission of) the training pattern (step 606) and then checks whether T replicas have been transmitted (step 608). In this example, the ST 114-1 checks whether the counter i has reached zero. If not, the counter i is decremented (i.e., i=i−1) (step 610) and the process returns to step 602 to transmit the next replica of the training pattern. Once the desired number of replicas has been transmitted, the process proceeds to step 612.

Whether proceeding from the "NO" branch of step 600 or from the "YES" branch of step 608, the ST 114-1 prepares a next synthetic packet for transmission (step 612). Note that parameters used to generate the synthetic packet (e.g., packet size, payload type, and/or the like) may be configured by the CS 118 or configured by the application function 106-1, e.g., in collaboration with the CS 118. Also note that packet generation may be based on Linear Feedback Shift Register (LFSR) or memory based buffers, for example. For instance, a LFSR may be used to create a pseudo random pattern that can be used as the payload of a synthetic packet. The ST 114-1 then transmits R replicas of the generated synthetic packet. More specifically, a counter "r" of the number of replicas transmitted is initialized to the desired number of replicas "R" (not shown). The desired number of replicas (R) is a natural number that is greater than or equal to 1. In some embodiments, R is a natural number that is greater than or equal to 2. The ST 114-1 waits until a scheduled time for transmitting the next replica of the synthetic packet (step 614). The scheduled time is preferably scheduled by the CS 118. Note that if there is a mismatch between the amount of scheduled resources and the desired number R of transmissions of the synthetic packet, this may be treated as an error. The ST 114-1 transmits (or initiates transmission of) the synthetic packet at the scheduled time (step 616). In some embodiments, a time stamp is inserted into the synthetic packet at the time of transmission to indicate its time of transmission. In one example embodiment, the synthetic packet is generated in step 612 with an empty time stamp field, and the time stamp is inserted into this empty field at step 616. The ST 114-1 then checks whether the number of replicas of the synthetic packet that have been transmitted has reached the desired number of replicas R (i.e., checks whether r=0 in this example) (step 618). If not, the ST 114-1 decrements r (i.e., r=r−1) (step 620), and the procedure returns to step 614 for transmission of the next replica of the synthetic packet. Once the desired number of replicas of the synthetic packet have been transmitted, the ST 114-1 resets the counter r to R (step 622), and the process returns to step 612 for transmission of R replicas of the next synthetic packet.

FIG. 7 illustrates the operation of the Rx WCD during the set up phase in accordance with one example embodiment of the present disclosure. Continuing the example from above, the Rx WCD is, in this example, the WCD 104-2. Initially, a counter "v" for the number of failures or violations detected on the D2D link is initialized to 1. As illustrated, in step 700, the SR 116-2 at the WCD 104-2 attempts to receive multiple synthetic packet transmissions from the ST 114-1 at the WCD 104-1 over a D2D link between the WCD 104-1 and the WCD 104-2 that uses a current resource allocation. Each synthetic packet transmission includes transmissions of R replicas of the respective synthetic packet, as discussed above. Also in step 700, based on results of the attempts to receive the synthetic packet transmissions on the D2D link using the current resource allocation, the SR 116-2 determines whether the D2D link, when using the current resource allocation, violates the reliability requirements(s) (e.g., for the corresponding service). As discussed above, these reliably requirement(s) include a latency requirement and, e.g., a packet error rate or packet success rate requirement. Note that statistics such as latency and packet error/success rate for the synthetic packets may be generated and maintained by the packet analyzer 300 of the SR 116-2. Further note that latency may be determined based on timestamps included in the replicas of the synthetic packet. If a violation occurs, the process proceeds to step 712, which is described below.

In this example, step 700 includes the following. At the scheduled time for transmission of R replicas of the next synthetic packet by the ST 114-1 at the WCD 104-1, the SR 116-2 at the WCD 104-2 monitors for (i.e., attempts to receive) the transmitted replicas of the synthetic packet (step 702) and determines whether the D2D link violates deterministic transfer (step 704). In some embodiments, the SR 116-2 monitors for all R replicas before the determination is made in step 704. If the D2D does not violate the deterministic transfer, the SR 116-2 retains the counter v (step 706), and the procedure returns to step 702 to monitor for the replicas of the next synthetic packet. Otherwise, if the D2D link violates deterministic transfer, the SR 116-2 determines whether the number of failures (v) detected on the D2D link is equal to V, where V is the number of violations that is to be hit before a violation indication message is generated and sent to the CS 118 (step 708).

If the number of failures (v) is not equal to V, then the SR 116-2 increments the counter v (step 710) and returns to step 702. Once the number of failures (v) reaches V (step 708, YES), the SR 116-2 sends a violation notification to the CS 118, e.g., either by sending an (indirect) NACK or a statistics report message with a violation indicator (step 712). The SR 116-2 resets the failure counter v (i.e., sets v=1) (step 714) and waits for a new resource allocation for reception of synthetic packets (step 716). Note that, in the case where the D2D does not fail during setup phase, the SR 116-2 may send packet statistics (i.e., a statistics report message) to the central resource allocator, e.g., after a specific number of synthetic packets have been received without a failure of the D2D link.

FIG. 8 illustrates the operation of the CS 118 during the set up phase in accordance with one example embodiment of the present disclosure. As illustrated, for a current resource allocation, the CA 118 receives a NACK or a statistics report, or otherwise receives a violation notification, from the WCD 104-2 (i.e., the Rx WCD for the D2D link) (step 800). The CA 118 determines whether it is possible to adjust the resource allocation for the D2D link (step 802). For example, the CA 118 may determine whether there are other possible resource allocations that are available and have not yet been tried for the D2D link in this iteration of the set up phase. If it is possible to adjust the resource allocation for the D2D link, the CA 118 computes or otherwise determines a new resource allocation for the D2D link (step 804). For example, the CS 118 may determine the resource allocation using an ϵ-greedy approach in Q-learning. The CS 118 notifies the WCD 104-1 and the WCD 104-2 (i.e., the WCDs corresponding to the failing D2D link) of the new resource allocation (step 806). The CS 118 applies the new resource allocation for the D2D link (e.g., reserves those resources for the D2D link so as to not schedule other interfering transmissions on those resources) and retains resource allocations for any non-failing D2D links (step 808).

Returning to step 802, if it is not possible to adjust the resource allocation of the failing D2D link, the CS 118 reports, to the WCD 104-1 and the WCD 104-2 (i.e., the WCDs corresponding to the failing D2D link), that the requested reliability requirements cannot be met for a D2D link between the WCD 104-1 and the WCD 104-2 (step 810). The CS 118 retains resource allocations for any non-failing D2D links (step 812).

Running Phase

Figure 9:
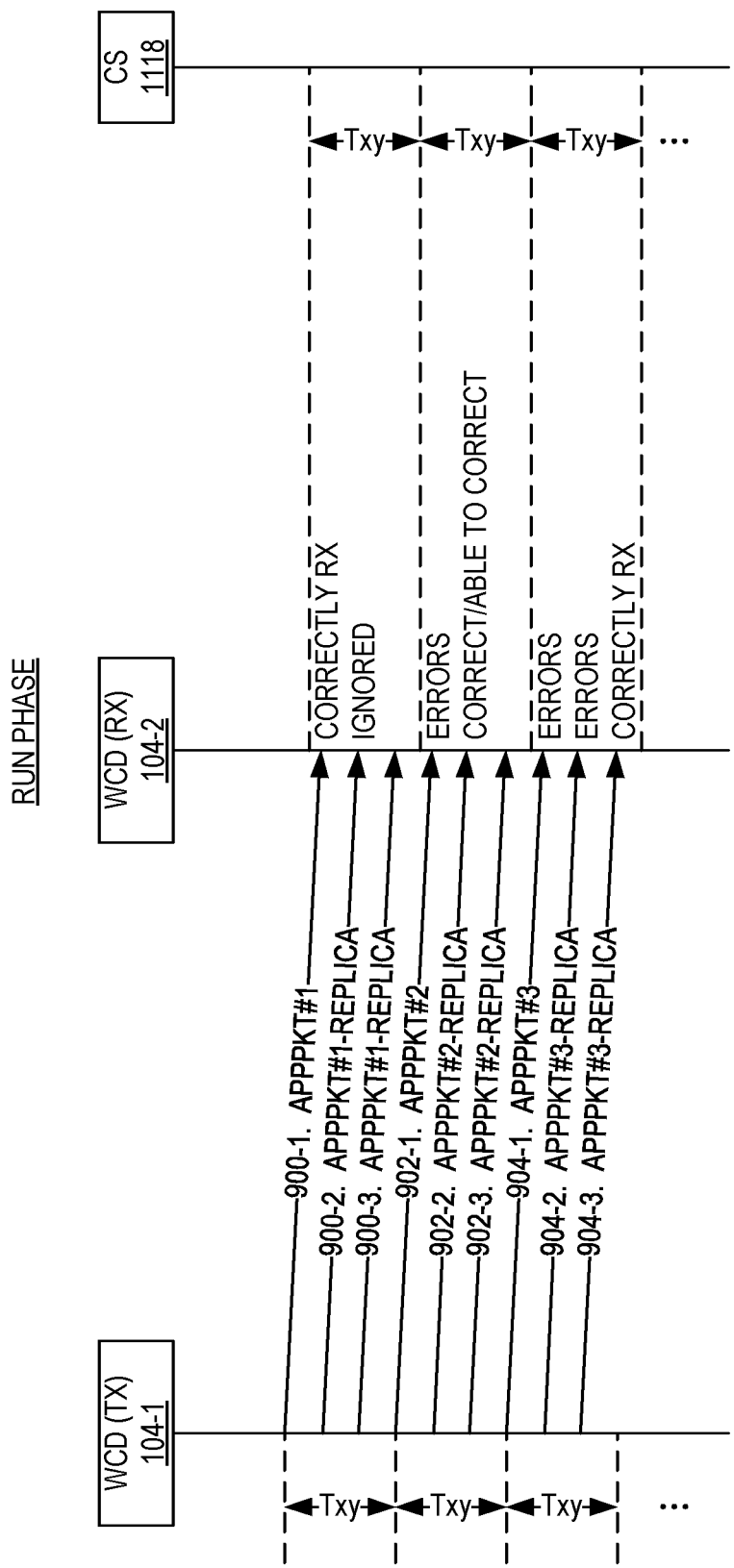
FIG. 9 illustrates the operation of the WCDs and the CS of FIG. 1 to perform a running phase for resource allocation for a D2D link between the WCDs, in accordance with some embodiments of the present disclosure.

The difference between set up and running phases is mainly that the real application can be now run with parameter settings derived from the initial set up phase as shown in FIG. 9. Thus, probability of meeting reliability requirements is enhanced, and resource allocation buffers can be efficiently planned. As illustrated in FIG. 9, the replication factor R is 3. Using a resource allocation provided by the CS 116, the AT 108-1 at the WCD 104-1 transmits three replicas of a first application packet (steps 900-1 through 900-3), transmits three replicas of a second application packet (steps 902-1 through 902-3), transmits three replicas of a third application packet (steps 904-1 through 904-3), and so on.

In this example, the AR 110-2 at the WCD 104-2 correctly receives the first replica of the first application packet in step 900-1 and, as such, can ignore the other replicas of the first application packet. When receiving the first replica of the second application packet in step 902-1, there are errors. However, the AR 110-2 is able to correctly receive the second replica of the second packet in step 902-2, possibly by combining with the erroneously received replica of the second packet from step 902-1. When receiving the third application packet, the AR 110-2 is not able to correctly receive the first and second replicas of the third application packet, but is able to correctly receive the third replica of the third packet in step 904-3, possibly by combining all three replicas.

Figure 10:
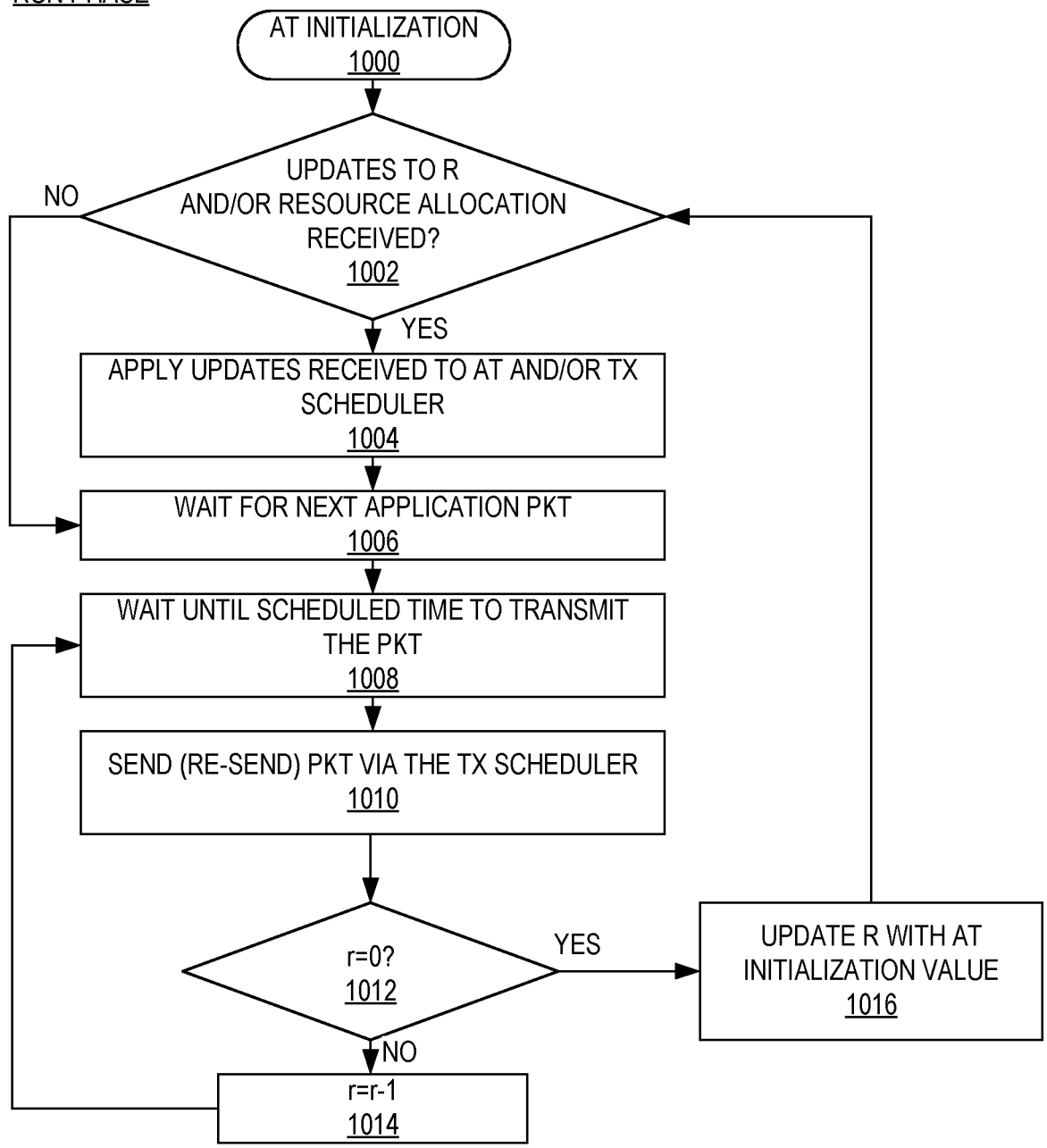
FIG. 10 illustrates the operation of the transmitting WCD during the running phase in accordance with one example embodiment of the present disclosure.
Figure 11:
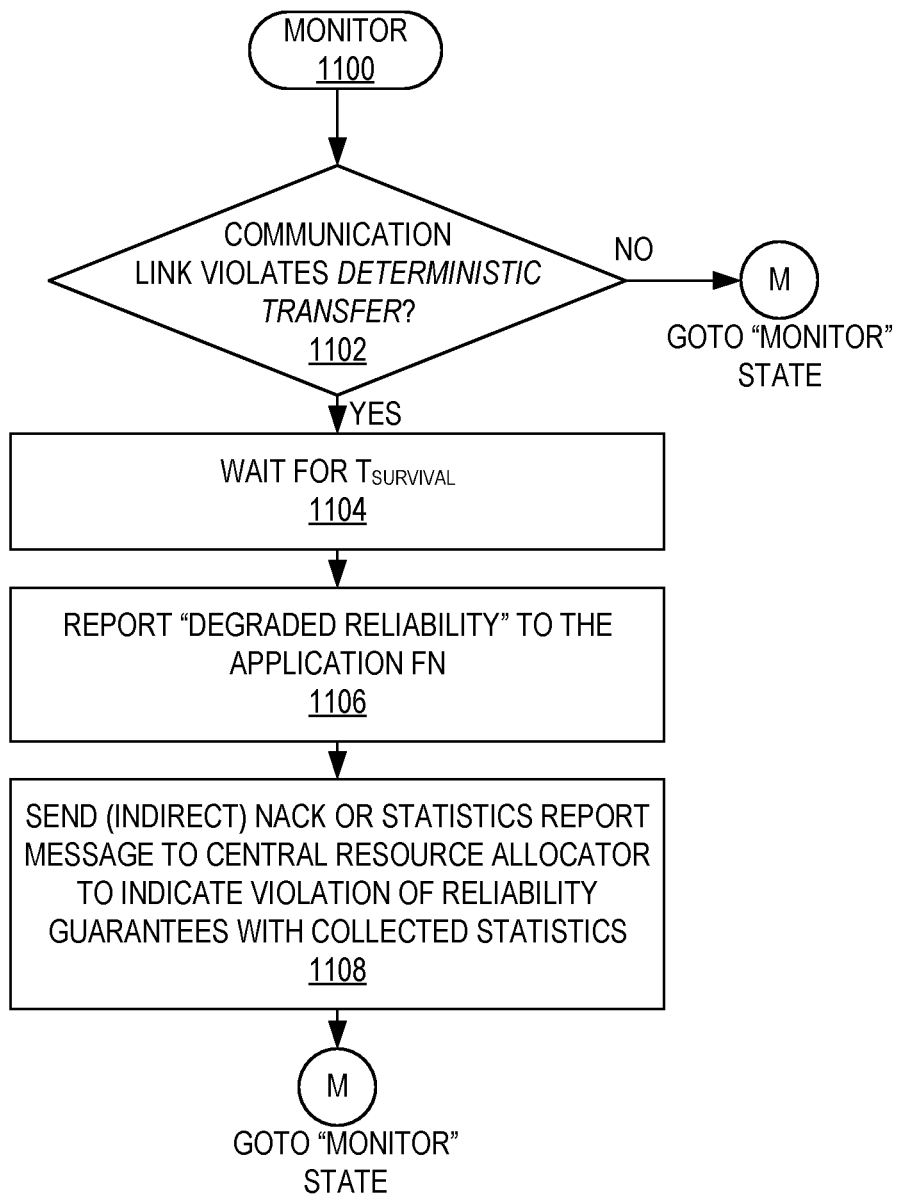
FIG. 11 illustrates the operation of the receiving WCD during the running phase in accordance with one example embodiment of the present disclosure.
Figure 12:
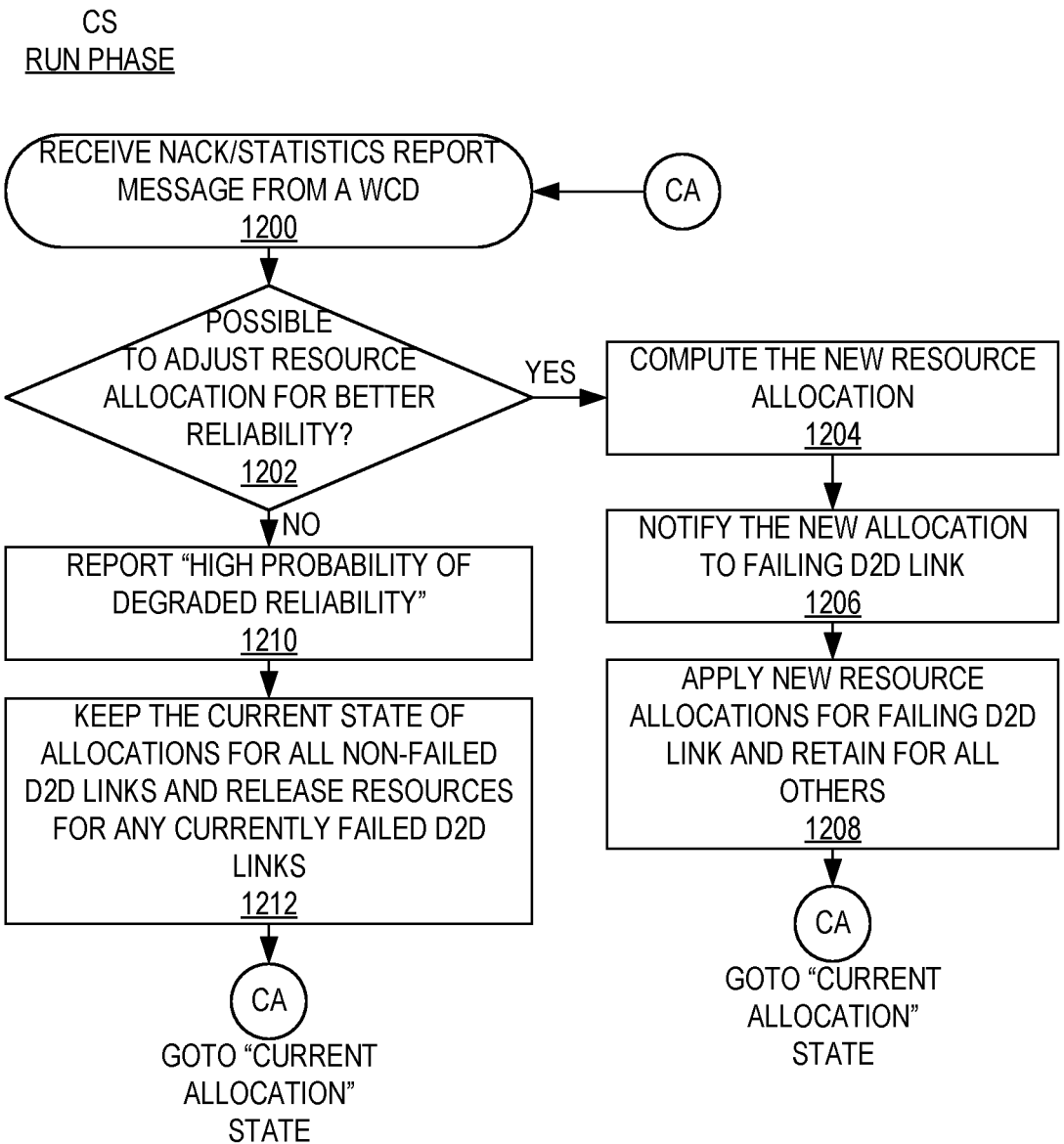
FIG. 12 illustrates the operation of the CS during the running phase in accordance with one example embodiment of the present disclosure.
Figure 13A:
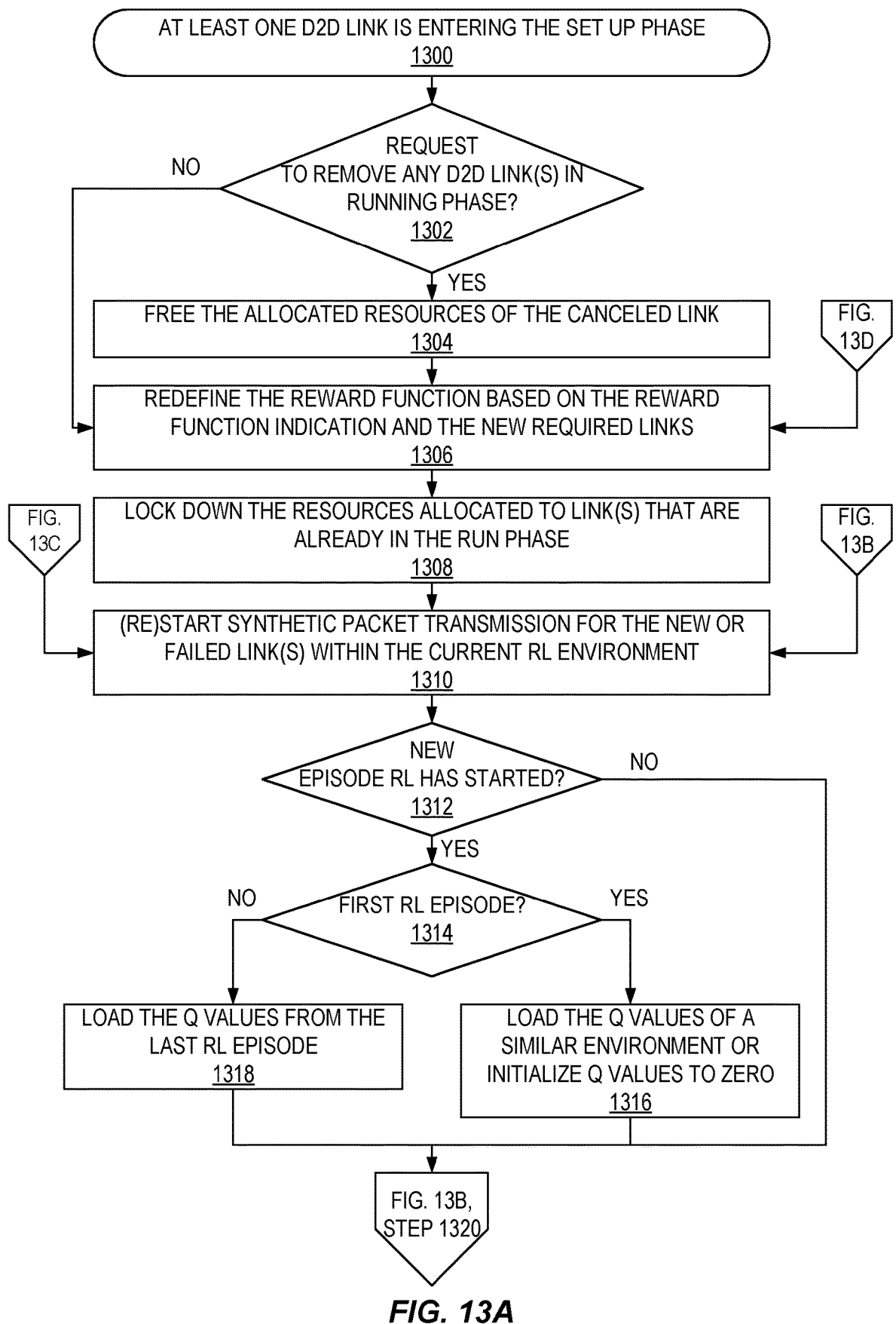
FIGS. 13A through 13D illustrate a flow chart that illustrates the operation of the CS to perform resource allocations for D2D links during both the set up phase and the running phase using a risk-sensitive Reinforcement Learning (RL) procedure in accordance with one example embodiment of the present disclosure.
Figure 13B:
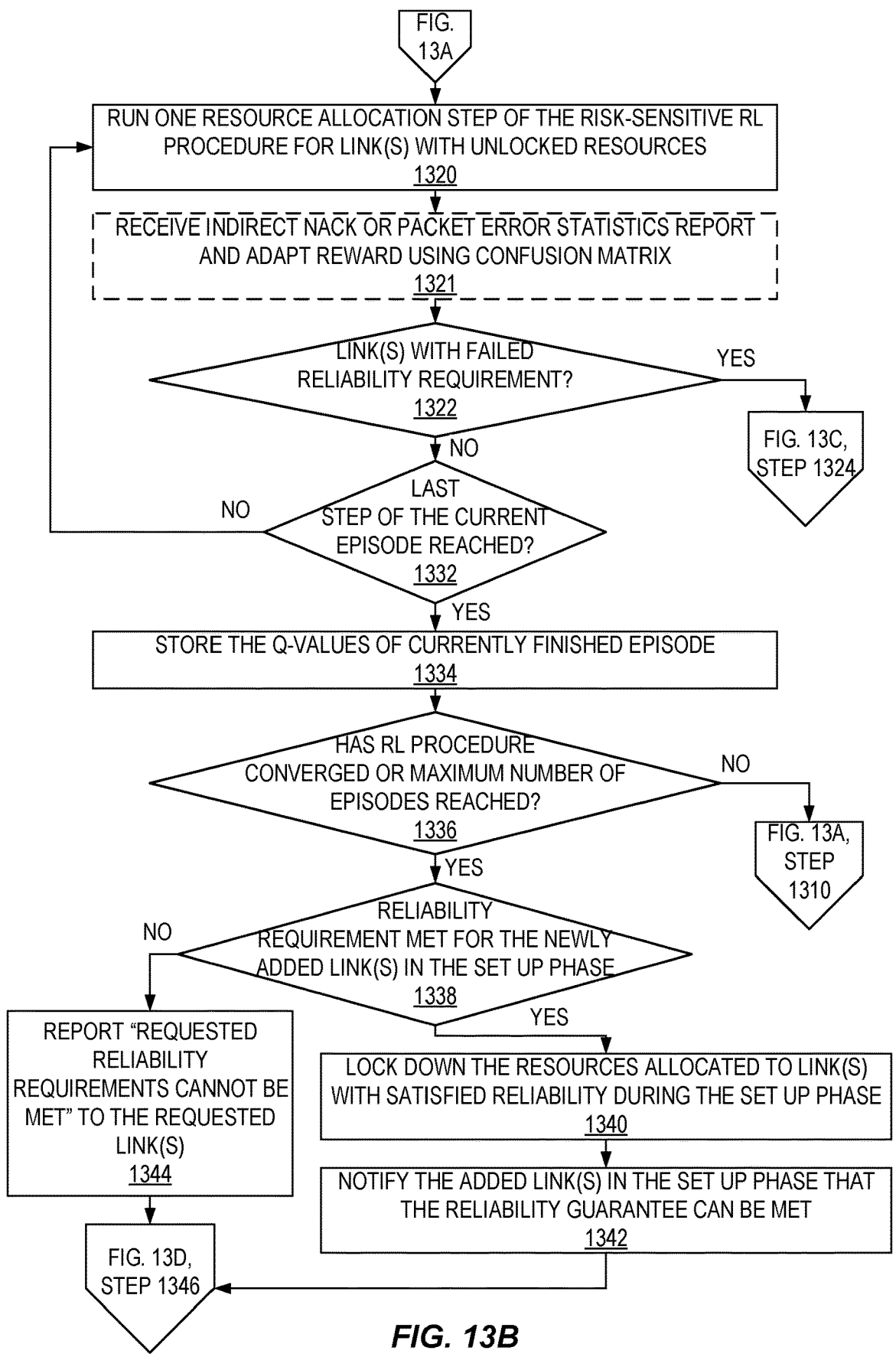
Figure 13C:
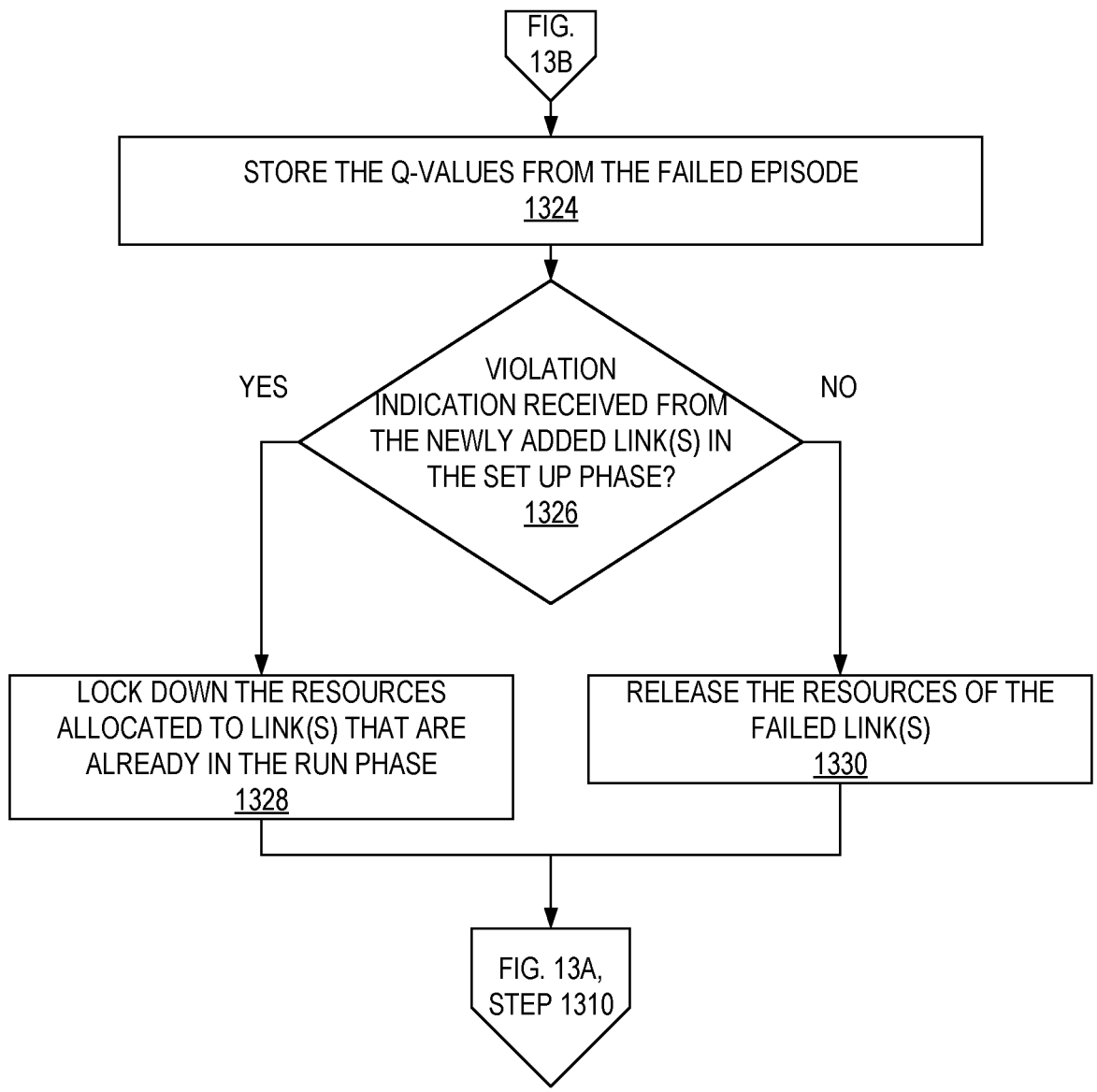
Figure 13D:
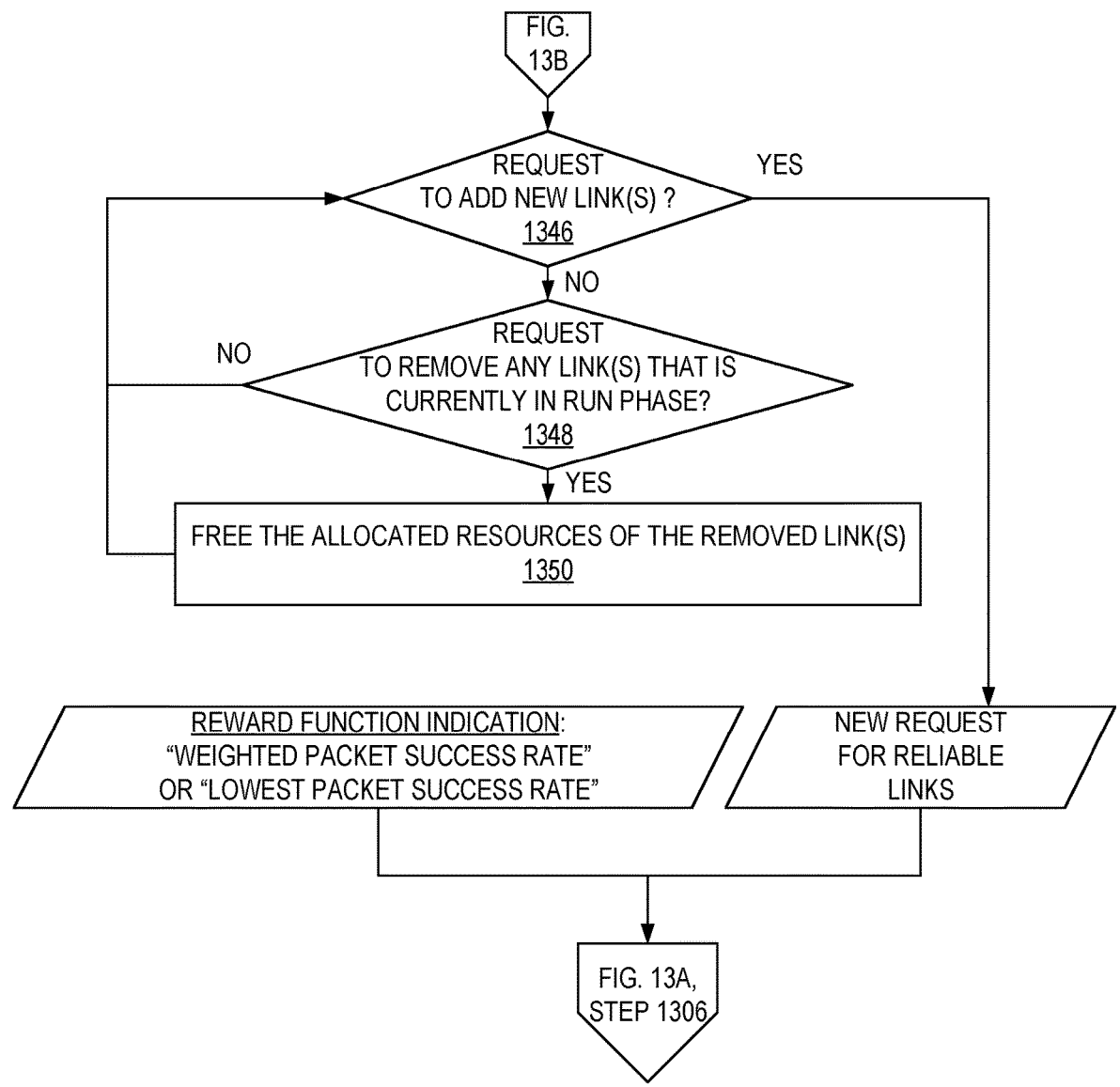

FIGS. 10 through 12 are flow charts that illustrate the operation of the Tx WCD (i.e., WCD 104-1 in the example above), the Rx WCD (i.e., WCD 104-2 in the example above), and the CS 118 during the running phase, in accordance with one example embodiment of the present disclosure. In particular, FIG. 10 illustrates the operation of the AT 108-1 of the Tx WCD during the running phase in accordance with one example embodiment of the present disclosure. Continuing the example from above, the Tx WCD is, in this example, the WCD 104-1. As illustrated, the AT 108-1 of the WCD 104-1 may perform an initialization procedure (step 1000). During this initialization procedure, the AT 108-1 is triggered by the application function 106-1 (e.g., by setting a corresponding flag that triggers the running phase) and synthetic packet generation is disabled because actual application packets will now be used in the running phase. Typically, the initial parameters used for transmission in the running phase are the same as those configured in the set up phase. As an example, for RL, the initial parameters could be the allocation of resources that are determined during the setup phase. As another example, the initial parameters may include resource allocations and Q values (in the case of Q-Learning) at the CS 118 and Txy and R values at the WCDs 104-1 and 104-2.

The AT 108-1 determines whether the WCD 104-1 has been an update to R and/or the resource allocation to be used for the D2D link (step 1002). If not, the process proceeds to step 1006. Otherwise, if an update to R and/or the resource allocation has been received, the AT 108-1 applies these updates (step 1004). The AT 108-1 waits for the next application packet from the application function 106-1 (step 1006) and then waits for the next scheduled time to transmit the next application packet (step 1008). Again, the scheduled time (e.g., scheduled TTI) may be scheduled by the CS 118 and notified to the WCD 104-1. The AT 108-1 then transmits (or initiates transmission of) the next application packet at the scheduled time using the configured resource allocation and number of replicas R. More specifically, initially a replica counter "r" is initialized to a R. The AT 108-1 transmits (or initiates transmission of) the application packet at the scheduled time using the configured resource allocation (step 1010). The AT 108-1 determines whether R replicas of this application packet have been transmitted by, in this example, determining whether the replica counter r is zero (step 1012). If not, the replica counter r is decremented (i.e., r=r−1) (step 1014) and the procedure returns to step 1008 to transmit the next replica of the application packet. Once R replicas of the application packet have been transmitted, the AT 108-1 resets the replica counter r=R (step 1016), and the process returns to step 1002 to check for updates and then wait for the next application packet to be transmitted.

FIG. 11 illustrates the operation of the SR 116-2 of the Rx WCD during the running phase in accordance with one example embodiment of the present disclosure. Continuing the example from above, the Rx WCD is, in this example, the WCD 104-2. As illustrated, at the scheduled time for transmission of R replicas of the next application packet by the AT 108-1 at the WCD 104-1, the SR 116-2 at the WCD 104-2 monitors for (i.e., attempts to receive) the transmitted replicas of the application packet (step 1100) and determines whether the D2D link violates deterministic transfer (step 1102). If not, the procedure returns to step 1100 to monitor for the replicas of the next application packet. Otherwise, if the D2D link violates deterministic transfer, the SR 116-2 waits for an amount of time ($T_{SURVIVAL}$) (step 1104) and then reports, to the application function 106-2, that there is a degraded reliability for the D2D link (step 1106) and sends a violation notification to the CS 118, e.g., either by sending an (indirect) NACK or a statistics report message with a violation indicator (step 1108). Note that $T_{SURVIVAL}$ is the time that an application can tolerate a missing data transmission. Not all applications may have such a time, in which case such $T_{SURVIVAL}$ could be set to a default value such as, e.g., 0. Also note that waiting for $T_{SURVIVAL}$ in step 1104 may be made optional by setting its value to 0. This would also cover scenarios that an application already wants a warning and the report sent in step 1106 can carry the $T_{SURVIVAL}$ time value. If it is 0, then the application knows this as well.

FIG. 12 illustrates the operation of the CS 118 during the running phase in accordance with one example embodiment of the present disclosure. As illustrated, for a current resource allocation for the D2D link, the CA 118 receives a NACK or a statistics report, or otherwise receives a violation notification, from the WCD 104-2 (i.e., the Rx WCD for the D2D link) (step 1200). The CA 118 determines whether it is possible to adjust the resource allocation for the D2D link (step 1202). For example, the CA 118 may determine whether there are other possible resource allocations that are available and have not yet been tried for the D2D link in this iteration of the setup phase. If it is possible to adjust the resource allocation for the D2D link, the CA 118 computes or otherwise determines a new resource allocation for the D2D link (step 1204). For example, the CS 118 may determine the resource allocation using an ϵ-greedy approach in Q-learning. The CS 118 notifies the WCD 104-1 and the WCD 104-2 (i.e., the WCDs corresponding to the failing D2D link) of the new resource allocation (step 1206). The CS 118 applies the new resource allocation for the D2D link (e.g., reserves those resources for the D2D link so as to not schedule other interfering transmissions on those resources) and retains resource allocations for any non-failing D2D links (step 1208).

Returning to step 1202, if it is not possible to adjust the resource allocation of the failing D2D link, the CS 118 reports, to the WCD 104-1 and the WCD 104-2 (i.e., the WCDs corresponding to the failing D2D link), that the requested reliability requirements cannot be met for a D2D link between the WCD 104-1 and the WCD 104-2 (step 1210). At the WCDs 104-1 and 104-2, the application layer gets notified that the requested reliability requirements cannot be met for a D2D link between the WCD 104-1 and the WCD 104-2. The CS 118 retains resource allocations for any non-failing D2D links and release resources of any currently failed links (step 1212).

RL Scheme for CS for Set Up Phase and Running Phase

When more WCDs 104 are present and the system 100 scales up, in some embodiments, an RL procedure (e.g., a Q-learning procedure) can be utilized for updating resource allocations for D2D links, e.g., during the set up phase and/or during the running phase. In one embodiment, the individual packet error rates multiplied by the time slots create the state space for the RL procedure. The individual packet error rates can vary for each WCD 104. In one embodiment, the reward for the RL procedure is defined as the statistical average of the sum of successfully transmitted packets by the WCDs 104 (i.e., the WCDs 104 having the D2D links).

In another embodiment, the minimum amount of the successfully transmitted packets among the WCDs 104 is considered as the reward for the RL procedure. This is beneficial if the goal is to satisfy the reliability for all the WCDs 104 having D2D links. In another embodiment, it is possible to consider a weighted sum of the successfully transmitted packets as the reward for the RL procedure, since different D2D links may have different reliability requirements (e.g., in a factory environment). Finally, the action for the RL procedure is defined as allocating the resources to individual WCDs 104 for their respective D2D links. If at least one of the WCDs 104 faces a packet error rate that is higher than a predefined threshold, the system enters a risk state and the value (e.g., Q-value) of the action that leads to that risk state decreases. The learning episode restarts after entering the risk state or reaching the end of a learning episode and the last updated state/action values are used in the new learning episode. In the new learning episode, the resource allocations of D2D links whose requirements are met are kept as same, while the allocations for the failing D2D link are updated, if possible. Heuristics based on current allocated time slots and/or frequency could be used to speed up the updating step or to find quick solutions for the failing D2D link to minimize the outage time for the failing D2D link.

To handle the error in violation notification reception, the noisy reward concept is added to the RL procedure [2]. The idea is to estimate a confusion matrix and then adapt the current rewards based on the confusion matrix to reflect the feedback error. Based on [3], the confusion matrix can use the history of true and noisy observed rewards. In our system, the confusion matrix can be estimated in the set up phase, before actual packet transmission, where statistics of the system are collected. In one example embodiment, the confusion matrix is estimated as follows. The reward, e.g. packet error rate, is divided into multiple arbitrary small levels, i.e., quantization. Then, they are put into a matrix denoted by R (note that matrix R is to be distinguished from the replication factor "R" discussed herein). Showing the matrix of noisy reward as $\hat{R}$, the real reward can be written as: $R = C\hat{R}$, where "C" is the confusion matrix which gives an unbiased estimation of the reward. The confusion estimation matrix refines the reward error rates dynamically using the aggregated rewards. In this work, the rewards in a RL episode could be aggregated to estimate the confusion matrix. As an example, as described in [3], the elements $\tilde{c}_{i,j}$ of the confusion matrix C can be estimated in accordance with:

$$\tilde{c}_{i,j} = \sum_{(s,a) \in S \times A} \frac{\#[\tilde{r}(s,a) = R_j | \hat{r}(s,a) = R_i]}{\#[\hat{r}(s,a) = R_i]}$$

where $\#[\cdot]$ denotes the number of state-action pairs that satisfies the condition $[\cdot]$ in the set of observed rewards $\hat{R}(s, a)$, $\hat{r}(s, a)$ and $\tilde{r}(s, a)$ denotes predicted true rewards and observed rewards when the state-action pair is (s, a). It should be noted that the state space for embodiments of the present disclosure is multiplication of the time of an RL episode and the possible quality of service values of the D2D links. The quality of the service can be defined by, e.g., the packet loss ratio of each D2D link. Assume "T" number of slots for a learning episode and "U" D2D links, this is shown as:

state space: $\{1, \ldots, T\} \times \{Q_1, \ldots, Q_U\}$.

The action in each state is the allocation of the frequency resources to each D2D link in a specific step of the RL algorithm. Thus, the elements of the equation above can be described as follows:

$c_{i,j}$: This is the element in the i-th row and j-th column of the concussion matrix C and models the relation between the predicted true reward, denoted by $R_i$ here, and the observed noisy reward, denoted by $R_j$. The values of $R_i$ and $R_j$ show a specific outcome of the predicted true reward, shown by $\tilde{r}(s, a)$ for state "s" and action "a", and the observed noisy reward, shown by $\hat{r}(s, a)$ for state "s" and action "a".

$R_i$: This is calculated using the accumulated historical values of the rewards of state "s" when taking action "a". This means the historical values of the packet error rates of a specific D2D link in time slot "t" of the episode (being in the state "s") when allocating a specific amount of frequency slots (taking the action "a"). For example, this could be averaging over these rewards.

$R_j$: This is represented by the collected statistic of a specific D2D link in the embodiments described herein. The confusion matrix C is M×M where M represents the number of possible outcome rewards, i.e., quantized reward level. This translates into quantized quality of the service for each user in this example.

FIGS. 13A through 13D illustrate a flow chart that illustrates the operation of the CS 118 to perform resource allocations for D2D links during both the set up phase and the running phase using a risk-sensitive RL procedure in accordance with one example embodiment of the present disclosure. In this example, the risk-sensitive RL procedure utilizes Q-learning. Note that the process of FIGS. 13A through 13D is only an example. Numerous variations will be apparent to those of skill in the art. Also, not all steps are required (i.e., some embodiments may not include some of the steps).

As illustrated, at least one new request for a D2D link is entering the set up phase (step 1300). For instance, one or more WCDs 104 may send requests to the CS 118 for setup of respective D2D links. The CS 118 determines whether there has been any request(s) to remove a D2D link(s) that is(are) in the running phase (step 1302). Such requests may, for example, originate from either of the WCDs 104 that is participating in the respective D2D link. If not, the process proceeds to step 1306. Otherwise, the CS 118 frees the allocated resources of the cancelled (i.e., the removed) D2D link(s) (step 1304).

The CS 118 defines (or redefines) the reward function for the risk-sensitive RL procedure is defined (or redefined) based on a reward function indication and the new D2D link(s) (step 1306). In one embodiment, the reward function is a statistical average of weighted packet success rates. More specifically, the packet success rate(s) of the newly required D2D link(s) is(are) weighted based on their reliability requirement(s) and added to the weighted packet success rate of other D2D links(s) (i.e., the other D2D link(s) in the set up phase, if any, and the other D2D link(s) in the running phase, if any). This reward is averaged over iterations. The reward function when taking a specific action in state $s_t$ can be written as:

$$r = E\left[\sum_{i=1}^{L} w_i P_i\right]$$

where L is the total number of D2D links, $w_i$ is the weight of the i-th D2D link, $P_i$ is the packet success rate of the i-th D2D link, and E is the statistical average. For example, let us say there are two D2D links running and a third D2D link is being set up, wherein link #1 requires 99.99% packet success rate, link #2 requires 99.9999% packet success rate, and link #3 requires 99.999% packet success rate. Then, each D2D link gets a different weight $w_i$ because their reliability requirements are different.

In another embodiment, the reward function is a statistical average of worst-case packet success rate. More specifically, the reward function takes the minimum among the packet success rate of the newly added D2D links(s) and the packet success rates of the previous D2D link(s). This type of reward function aims for reliability fairness among the D2D links. When taking a specific action in state $s_t$, the reward function can be written as:

$$r = E\left[\min_{i=1,\ldots,L} P_i\right].$$

The CS 118 locks down the allocated resources for the D2D link(s) that are already in the running phase (step 1308). In other words, those allocated resources are not changed by the subsequent resource allocation in step 1320. The CS 118 instructs or otherwise triggers the WCDs 104 associated with the new D2D link(s) being set up, as well as the WCDs 104 associated with any failed D2D link(s) (as described below), to start (or restart) transmission of synthetic packets (i.e., triggers the WCDs 104 associated with the D2D links being set up to enter the set up phase, as described above, and triggers the WCDs 104 associated with any failed D2D link(s) to enter the set up phase, as described above) (step 1310).

For the risk-sensitive RL procedure, the CS 118 determines whether a new episode of the risk-sensitive RL procedure has started (step 1312). A new episode is started either upon startup of the system, upon the system entering a risk state, or upon a predefined amount of time or a predefined number of steps/iterations having been performed for the current episode. If a new episode has not started, the process proceeds to step 1320 to perform the next step of the current episode. If a new episode has started, the CS 118 initializes the Q-values for the risk-sensitive RL procedure. More specifically, in this example, if this is the first episode (step 1314, YES), the CS 118 initializes the Q-values to some default value (e.g., zero) or to Q-values previously determined for a similar environment(s) (step 1316). If it is not the first episode (step 1314, NO), the CS 118 initializes the Q-values for the episode to the Q-values stored at the end of the previous episode (step 1318).

The CS 118 runs one resource allocation step of the risk-sensitive RL procedure for the D2D link(s) with unlocked resources (step 1320). More specifically, the CS 118 computes a resource allocation for each of the new D2D links in the set up phase and each of the failed D2D links, if any, where the resource allocations utilize only unlocked resources (i.e., only resources that are not already allocated to non-failed D2D links in the running phase). The resource allocation includes, e.g., time-frequency resources and/or code resources for a particular number of replicas R of a packet. Note that different resource allocation steps may result in resource allocations for different values of R. The CS 118 provides the computed resource allocations to the associated WCDs 104.

As discussed above, for each D2D link, the computed resource allocation is used by the ST 114 to transmit R replicas of each of a number of synthetic packets. The number of synthetic packets may be, e.g., 10s of synthetic packets, 100s of synthetic packets, or 1,000s of synthetic packets. In some embodiments, the CS 118 receives indirect NACK(s) or packet error statistics report(s) from the SRs 116 at the Rx ends of the D2D links (both in the set up phase and in the running phase) and adapts the reward used for the RL procedure using the confusion matrix (step 1321). Again, the confusion matrix may be estimated as described above. Based on statistics reports and possibly violation notifications from the SRs 116 at the Rx ends of the D2D links (both in the set up phase and in the running phase) or, if step 1321 is performed, based in the adapted reward, the CS 118 determines whether any D2D link(s) in the set up phase or in the running phase has(have) failed its(their) reliability requirement(s) (step 1322). If so, the CS 118 determines that the system has entered a risk state, in which case the CS 118 ends the current episode. More specifically, the CS 118 computes and stores Q-values (based on the reported statistics for the D2D links) for the failed episode (step 1324). In one embodiment, when using risk-sensitive RL, in addition to the reward signal (e.g., packet success rate), there is a second signal, denoted as a risk signal. If a state (i.e., a state as represented by, e.g., the current time slot and the quality of service of the D2D links) is not risk-state, then the second signal, i.e., the risk signal, is equal to 0. However, if the state is a risk-state, then the second signal is set to a value "a", where "a" can be, e.g., 1, which increases the risk of a specific state. Then, the Q-values are computed based on a state-action value function (i.e., a Q-function) that is a combination of two Q-functions, namely, a first Q-function that is calculated using the reward derived from the packet success rates and the second Q-function that is derived using the second signal which is based on the risk-state.

In addition, the CS 118 determines whether a violation notification was received from any of the new D2D links in the set up phase (step 1326). If so, the CS 118 assumes that the previously failed D2D link(s) that are already in the running phase have been repaired and, as such, locks down the resources allocated to those previously failed D2D link(s) (step 1328). Otherwise, the CS 118 assumes that the failed episode is due to one or more newly failed D2D links that are already in the running phase and, as such, releases the resources allocated for those newly failed D2D links (step 1330). Whether proceeding from step 1328 or 1330, the process returns to step 1310.

Returning to step 1322, if the CS 118 determines that there are no failed D2D links for the resource allocation step of the current episode, the CS 118 determines whether the last step of the current episode has been reached (step 1332). If not, the process returns to step 1320 where the CS 118 performs a new resource allocation step for the current episode of the risk-sensitive RL procedure. Once the last step of the current episode of the risk-sensitive RL procedure has been reached, the CS 118 computes and stores Q-values for the current episode (e.g., based on the statistics reported by the WCDs 104 for the D2D links) (step 1334).

The CS 118 determines whether the risk-sensitive RL procedure has converged or a maximum number of episodes has been reached (step 1336). In one embodiment, the CS 118 checks for convergence by checking if the reliability constraints are satisfied for one or more RL episodes depending on the channel coherence time. If the length of the RL episode, T, is less than the channel coherence time, the reliability constraints are tested over multiple learning episodes. If the risk-sensitive RL procedure has not converged and the maximum number of episodes has not been reached, the process returns to step 1310 where the CS 118 starts a new episode. Otherwise, the CS 118 determines whether the reliability requirement(s) are met for the newly added D2D link(s) in the set up phase (step 1338). If so, the CS 118 locks down the resources allocated to the new D2D link(s) in the set up phase for which the reliability requirement(s) are met (step 1340) and notifies the WCDs 104 associated with those D2D link(s) that reliability requirements can be met (step 1342). These D2D link(s) may then transition to the running phase. For any new D2D link(s) in the set up phase for which the reliability requirement(s) are not met, the CS 118 notifies the WCDs 104 associated with those D2D link(s) that the requested reliability requirements cannot be met (step 1344).

Whether proceeding from step 1342 or 1344, the CS 118 determines whether there have been any requests for new D2D links (step 1346). If so, the process returns to step 1306. Otherwise, the CS 118 determines whether there have been any requests to remove a D2D link(s) that is in the running phase (step 1348). If not, the process returns to step 1346. Otherwise, the CS 118 frees the resources allocated to the removed D2D link(s) (step 1350), and the process returns to step 1346.

Figure 14:
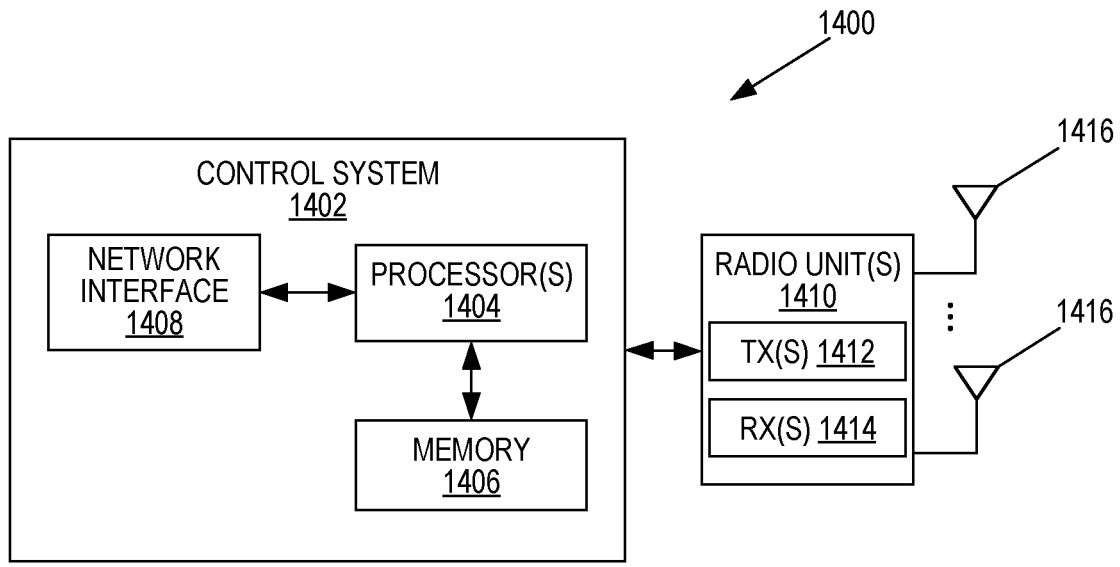
FIGS. 14 through 16 illustrate example embodiments of a radio access node.

FIG. 14 is a schematic block diagram of a radio access node 1400 according to some embodiments of the present disclosure. The radio access node 1400 may be, for example, a base station 102. As illustrated, the radio access node 1400 includes a control system 1402 that includes one or more processors 1404 (e.g., Central Processing Units (CPUs), Application Specific Integrated Circuits (ASICs), Field Programmable Gate Arrays (FPGAs), and/or the like), memory 1406, and a network interface 1408. The one or more processors 1404 are also referred to herein as processing circuitry. In addition, the radio access node 1400 includes one or more radio units 1410 that each includes one or more transmitters 1412 and one or more receivers 1414 coupled to one or more antennas 1416. The radio units 1410 may be referred to or be part of radio interface circuitry. In some embodiments, the radio unit(s) 1410 is external to the control system 1402 and connected to the control system 1402 via, e.g., a wired connection (e.g., an optical cable). However, in some other embodiments, the radio unit(s) 1410 and potentially the antenna(s) 1416 are integrated together with the control system 1402. The one or more processors 1404 operate to provide one or more functions of a radio access node 1400 as described herein (e.g., one or more functions of the CS 118 as described herein). In some embodiments, the function(s) are implemented in software that is stored, e.g., in the memory 1406 and executed by the one or more processors 1404.

Figure 15:
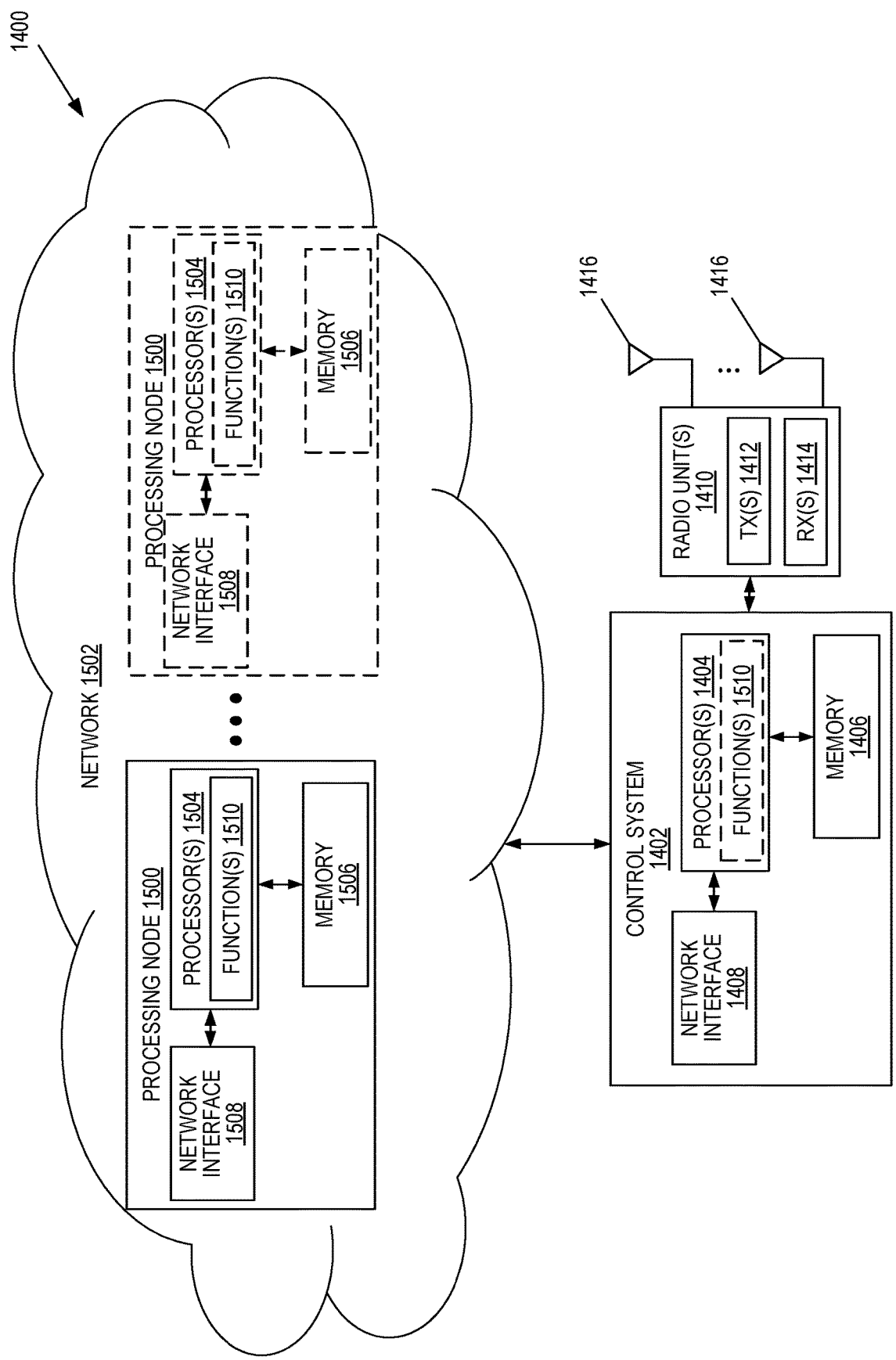

FIG. 15 is a schematic block diagram that illustrates a virtualized embodiment of the radio access node 1400 according to some embodiments of the present disclosure. This discussion is equally applicable to other types of network nodes. Further, other types of network nodes may have similar virtualized architectures.

As used herein, a "virtualized" radio access node is an implementation of the radio access node 1400 in which at least a portion of the functionality of the radio access node 1400 is implemented as a virtual component(s) (e.g., via a virtual machine(s) executing on a physical processing node(s) in a network(s)). As illustrated, in this example, the radio access node 1400 includes the control system 1402 that includes the one or more processors 1404 (e.g., CPUs, ASICs, FPGAs, and/or the like), the memory 1406, and the network interface 1408 and the one or more radio units 1410 that each includes the one or more transmitters 1412 and the one or more receivers 1414 coupled to the one or more antennas 1416, as described above. The control system 1402 is connected to the radio unit(s) 1410 via, for example, an optical cable or the like. The control system 1402 is connected to one or more processing nodes 1500 coupled to or included as part of a network(s) 1502 via the network interface 1408. Each processing node 1500 includes one or more processors 1504 (e.g., CPUs, ASICs, FPGAs, and/or the like), memory 1506, and a network interface 1508.

In this example, functions 1510 of the radio access node 1400 described herein are implemented at the one or more processing nodes 1500 or distributed across the control system 1402 and the one or more processing nodes 1500 in any desired manner. In some particular embodiments, some or all of the functions 1510 of the radio access node 1400 described herein are implemented as virtual components executed by one or more virtual machines implemented in a virtual environment(s) hosted by the processing node(s) 1500. As will be appreciated by one of ordinary skill in the art, additional signaling or communication between the processing node(s) 1500 and the control system 1402 is used in order to carry out at least some of the desired functions 1510. Notably, in some embodiments, the control system 1402 may not be included, in which case the radio unit(s) 1410 communicate directly with the processing node(s) 1500 via an appropriate network interface(s).

In some embodiments, a computer program including instructions which, when executed by at least one processor, causes the at least one processor to carry out the functionality of radio access node 1400 or a node (e.g., a processing node 1500) implementing one or more of the functions 1510 of the radio access node 1400 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 16:
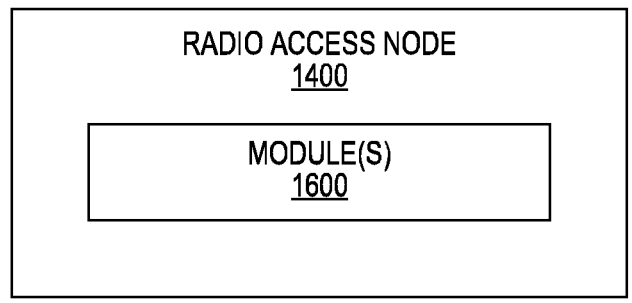

FIG. 16 is a schematic block diagram of the radio access node 1400 according to some other embodiments of the present disclosure. The radio access node 1400 includes one or more modules 1600, each of which is implemented in software. The module(s) 1600 provide the functionality of the radio access node 1400 described herein. This discussion is equally applicable to the processing node 1500 of FIG. 15 where the modules 1600 may be implemented at one of the processing nodes 1500 or distributed across multiple processing nodes 1500 and/or distributed across the processing node(s) 1500 and the control system 1402.

Figure 17:
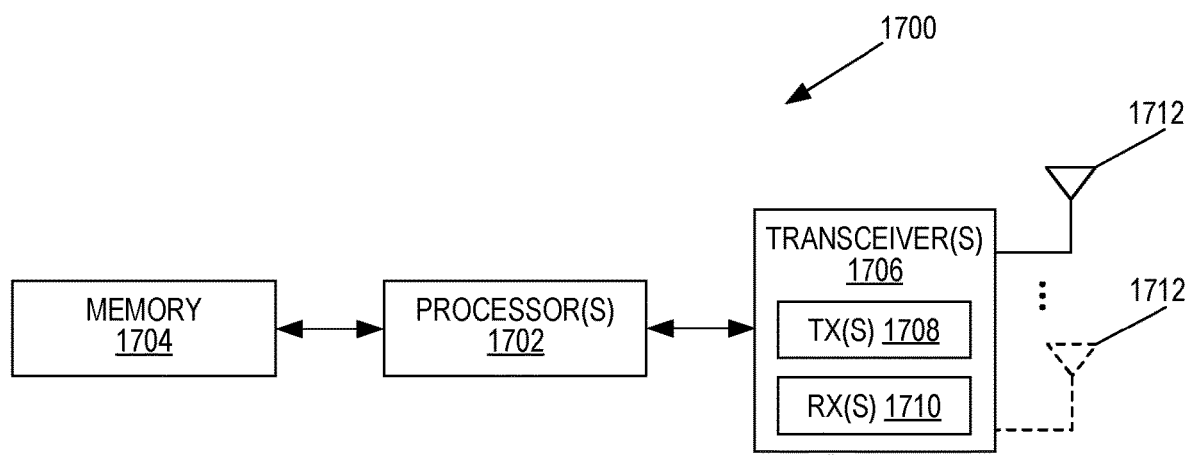
FIGS. 17 and 18 illustrate example embodiments of a WCD.

FIG. 17 is a schematic block diagram of a WCD 1700 (e.g., the WCD 104-1 or the WCD 104-2) according to some embodiments of the present disclosure. As illustrated, the WCD 1700 includes one or more processors 1702 (e.g., CPUs, ASICs, FPGAs, and/or the like), memory 1704, and one or more transceivers 1706 each including one or more transmitters 1708 and one or more receivers 1710 coupled to one or more antennas 1712. The transceiver(s) 1706 includes radio-front end circuitry connected to the antenna(s) 1712 that is configured to condition signals communicated between the antenna(s) 1712 and the processor(s) 1702, as will be appreciated by on of ordinary skill in the art. The processors 1702 are also referred to herein as processing circuitry. The transceivers 1706 are also referred to herein as radio circuitry. In some embodiments, the functionality of the WCD 1700 described above may be fully or partially implemented in software that is, e.g., stored in the memory 1704 and executed by the processor(s) 1702. Note that the WCD 1700 may include additional components not illustrated in FIG. 17 such as, e.g., one or more user interface components (e.g., an input/output interface including a display, buttons, a touch screen, a microphone, a speaker(s), and/or the like and/or any other components for allowing input of information into the WCD 1700 and/or allowing output of information from the WCD 1700), a power supply (e.g., a battery and associated power circuitry), etc.

In some embodiments, a computer program including instructions which, when executed by at least one processor, causes the at least one processor to carry out the functionality of the WCD 1700 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 18:
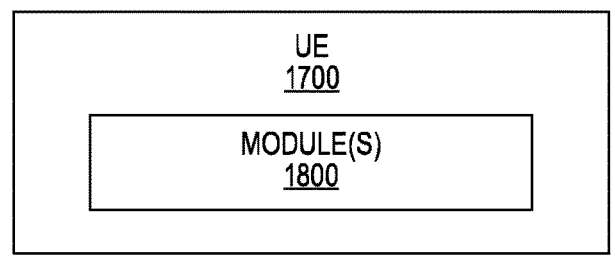

FIG. 18 is a schematic block diagram of the WCD 1700 according to some other embodiments of the present disclosure. The WCD 1700 includes one or more modules 1800, each of which is implemented in software. The module(s) 1800 provide the functionality of the WCD 1700 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
    5G Fifth Generation
    ACK Acknowledgement
    AMF Access and Mobility Function
    AR Application Function Reception Unit
    ASIC Application Specific Integrated Circuit
    AT Application Function Transmission Unit
    AUSF Authentication Server Function
    CPU Central Processing Unit
    CS Centralized Scheduler
    CSI Channel State Information
    D2D Device-to-Device
    DSP Digital Signal Processor
    eMBB Enhanced Mobile Broadband
    eNB Enhanced or Evolved Node B
    FPGA Field Programmable Gate Array
    gNB New Radio Base Station
    gNB-CU New Radio Base Station Central Unit
    gNB-DU New Radio Base Station Distributed Unit
    HARQ Hybrid Automatic Repeat Request
    HSS Home Subscriber Server
    IoT Internet of Things
    LFSR Linear Feedback Shift Register
    LTE Long Term Evolution
    MME Mobility Management Entity
    ms Millisecond MTC Machine Type Communication
NACK Negative Acknowledgement
NEF Network Exposure Function
NF Network Function
NR New Radio
NRF Network Function Repository Function
NSSF Network Slice Selection Function
PC Personal Computer
PCF Policy Control Function
P-GW Packet Data Network Gateway
QoS Quality of Service
RAM Random Access Memory
RAN Radio Access Network
RL Reinforcement Learning
ROM Read Only Memory
Rx Receive
SCEF Service Capability Exposure Function
SMF Session Management Function
SR Synthetic Function Reception Unit
ST Synthetic Function Transmission Unit
TSN Time Sensitive Networking
TTI Transmission Time Interval
Tx Transmit
UDM Unified Data Management
UE User Equipment
UPF User Plane Function
URLLC Ultra Reliable Low Latency Communication
WCD Wireless Communication Device Those skilled in the art will recognize improvements and modifications to the embodiments of the present disclosure. All such improvements and modifications are considered within the scope of the concepts disclosed herein.

REFERENCES

[1] "3GPP TR22.804 V16.2.0 Chapter 4," 2018.
[2] N. Ben-Khalifa, M. Assaad and M. Debbah, "Risk-Sensitive Reinforcement Learning for URLLC Traffic in Wireless Networks," in *IEEE Wireless Communications and Networking Conference,* Marrakech, Morocco, 2019.
[3] J. Wang, Y. Liu and B. Li, "Reinforcement Learning with Perturbed Rewards," in *International conference on Learning Representations,* New Orleans, 2019.

The invention claimed is:

1. A method performed by a second Wireless Communication Device, WCD, to ascertain whether a Device-to-Device, D2D, link between a first WCD and the second WCD in a cellular communications system is able to satisfy a requirement, the method comprising:
attempting to receive a plurality of synthetic packet transmissions from the first WCD over a D2D link using a current resource allocation, each synthetic packet transmission of the plurality of synthetic packet transmissions comprising R replicas of a respective synthetic packet, wherein R is a natural number that is greater than or equal to 1;
determining that the D2D link violates the requirement based on results of the attempting to receive the plurality of synthetic packet transmissions; and
upon determining that the D2D link violates the requirement, sending, to a Centralized Scheduler, CS, in the cellular communications system, a violation notification that notifies the CS that the D2D link violates the requirement when using the current resource allocation.

2. The method of claim 1 wherein the requirement is a reliability requirement.

3. The method of claim 2 wherein the reliability requirement comprises a required packet success rate, where a packet success comprises receiving a packet within a required latency bound.

4. The method of claim 1 wherein the requirement comprises a required latency bound.

5. The method of claim 1 wherein sending the violation notification comprises sending an indirect Negative Acknowledgement, NACK.

6. The method of claim 5 further comprises sending a statistics report comprising a packet success rate for the D2D link using the current resource allocation.

7. The method of claim 1 wherein the resource allocation comprises a number of time-frequency resources.

8. The method of claim 1 further comprising:
receiving a new resource allocation;
attempting to receive a plurality of synthetic packet transmissions from the first WCD over the D2D link using the new resource allocation, each synthetic packet transmission of the plurality of synthetic packet transmissions comprising R' replicas of a respective synthetic packet, wherein R' is a natural number that is greater than or equal to 1 and may or may not equal R; and
determining whether the D2D link violates the requirement based on results of the attempting to receive the plurality of synthetic packet transmissions over the D2D link using the new resource allocation.

9. The method of claim 1 further comprising:
receiving either a new resource allocation or a notification that the requirement cannot be met using the D2D link.

10. The method of claim 1 wherein attempting to receive the plurality of synthetic packet transmissions from the first WCD over the D2D link using the current resource allocation, determining that the D2D link violates the requirement, and sending the violation notification are performed during a set up phase.

11. The method of claim 10 wherein, if the D2D link is able to meet the requirement at an end of the set up phase, a resource allocation used for the D2D link during the set up phase is used as an initial resource allocation for the D2D link during a running phase.

12. The method of claim 1 wherein, for each synthetic packet transmission of the plurality of synthetic packet transmissions, the R replicas of the synthetic packet being transmitted on different time resources.

13. The method of claim 1 wherein, for each synthetic packet transmission of the plurality of synthetic packet transmissions, the R replicas of the synthetic packet being transmitted on different frequency resources but at least partially overlap in time.

14. The method of claim 1 wherein the D2D link is a direct D2D link between the first WCD and the second WCD.

15. The method of claim 1 wherein the D2D link is an indirect D2D link between the first WCD and the second WCD.

16. The method of claim 1 wherein the D2D link is one hop of a multi-hop D2D link.

17. The method of claim 1 wherein the CS is implemented in a base station in the cellular communications system or in a network node associated with the base station in the cellular communications system.

18. The method of claim 1 wherein the CS is implemented in either the first WCD or the second WCD.

19. A second Wireless Communication Device, WCD, wherein the second WCD comprises:

one or more transmitters;

one or more receivers; and processing circuitry associated with the one or more transmitters and the one or more receivers, the processing circuitry configured to cause the second WCD to:
attempt to receive the plurality of synthetic packet transmissions from the first WCD over a Device-to-Device, D2D, link using the current resource allocation;

determine that the D2D link violates the requirement; and upon determining that the D2D link violates the requirement, send the violation notification.

* * * * *